(12) United States Patent
Kuiper et al.

(10) Patent No.: US 9,845,198 B2
(45) Date of Patent: Dec. 19, 2017

(54) APPARATUS AND METHOD FOR TRACKING CONVEYOR BELTS

(71) Applicant: Flexible Steel Lacing Company, Downers Grove, IL (US)

(72) Inventors: Daniel J. Kuiper, Alto, MI (US); Brett E. DeVries, Comstock Park, MI (US); Richard W. Gilman, Sparta, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 15/160,915

(22) Filed: May 20, 2016

(65) Prior Publication Data

US 2016/0264358 A1   Sep. 15, 2016

Related U.S. Application Data

(63) Continuation of application No. 13/791,729, filed on Mar. 8, 2013, now Pat. No. 9,346,622.

(Continued)

(51) Int. Cl.
  *B65G 39/16*   (2006.01)
  *B65G 15/64*   (2006.01)
  (Continued)

(52) U.S. Cl.
  CPC ............ *B65G 15/64* (2013.01); *B65G 39/16* (2013.01); *B65G 2812/02168* (2013.01)

(58) Field of Classification Search
  None
  See application file for complete search history.

(56) References Cited

U.S. PATENT DOCUMENTS

| 2,160,057 A | 5/1939 | Carus et al. |
| 2,225,276 A | 12/1940 | Parker |

(Continued)

FOREIGN PATENT DOCUMENTS

| AU | 658110 | 1/1995 |
| CH | 686507 A5 | 4/1996 |

(Continued)

OTHER PUBLICATIONS

"Persuader PT Max and PT Smart Belt Trainers" issued by Flexible Steel Lacing Company, Jul. 2000 (2 pages).

(Continued)

*Primary Examiner* — Kavel Singh
(74) *Attorney, Agent, or Firm* — Fitch, Even, Tabin & Flannery LLP

(57) ABSTRACT

A tracking apparatus and method for urging a mistracking conveyor belt back towards a correct travel path are provided. The apparatus and method both utilize downstream shifting of an end portion of an idler roller due to mistracking of the conveyor belt for directing or steering the belt back toward its correct travel path and a reaction force from the belt due to the steering thereof for energizing a tilting action of the idler roller to raise the downstream end portion thereof. In this manner, the tilting of the idler roller is not mechanically coupled to the downstream shifting of the roller end portion allowing the belt tracking apparatus herein to be bi-directional for use with conveyor belts that may be run in opposite travel directions.

13 Claims, 39 Drawing Sheets

Related U.S. Application Data

(60) Provisional application No. 61/608,333, filed on Mar. 8, 2012.

(51) Int. Cl.
    *B65G 39/00*    (2006.01)
    *B65G 39/12*    (2006.01)
    *B65G 15/60*    (2006.01)

(56) References Cited

U.S. PATENT DOCUMENTS

| | | |
|---|---|---|
| 2,256,685 A | 9/1941 | Parker |
| 2,330,923 A | 10/1943 | Robins |
| 2,653,700 A | 9/1953 | Sloane |
| 2,725,757 A | 12/1955 | Murphy |
| 2,815,851 A | 12/1957 | Yoshimura |
| 3,001,680 A | 9/1961 | Nitkiewicz |
| 3,066,547 A | 12/1962 | Evans et al. |
| 3,240,321 A * | 3/1966 | Lo Presti ............... B65G 39/16 198/808 |
| 3,368,665 A | 2/1968 | Jinkins |
| 3,593,841 A | 7/1971 | Leow |
| 3,596,817 A | 8/1971 | Morse et al. |
| 3,603,451 A | 9/1971 | Promin et al. |
| 3,621,728 A | 11/1971 | Steorts, Jr. |
| 5,358,098 A | 10/1994 | Sundstrom et al. |
| 5,609,241 A | 3/1997 | Shaw |
| 5,911,304 A | 6/1999 | Cumberlege |
| 5,950,806 A | 9/1999 | Warneke |
| 6,116,410 A | 9/2000 | Malmberg |
| 6,131,726 A | 10/2000 | Hovsto et al. |
| 6,173,830 B1 * | 1/2001 | Cumberlege .......... B65G 39/16 198/806 |
| 6,241,078 B1 | 6/2001 | Mott |
| 6,405,854 B1 | 6/2002 | Cumberlege |
| 6,431,348 B2 | 8/2002 | Malmberg |
| 7,051,967 B2 | 5/2006 | Kitajima |
| 7,614,493 B2 | 11/2009 | Dowling et al. |
| 7,669,709 B2 | 3/2010 | Hovsto et al. |
| 7,967,129 B2 * | 6/2011 | Swinderman .......... B65G 39/16 198/808 |
| 8,556,068 B2 | 10/2013 | Devries |
| 9,346,622 B2 | 5/2016 | Kuiper et al. |
| 2001/0023815 A1 | 9/2001 | Mott |
| 2001/0040086 A1 | 11/2001 | Riffe |
| 2003/0015394 A1 | 1/2003 | Nimmo et al. |
| 2006/0027444 A1 | 2/2006 | Donnenhoffer |
| 2006/0076217 A1 | 4/2006 | Cumberlege |
| 2009/0178901 A1 | 7/2009 | Hovsto et al. |
| 2010/0116626 A1 | 5/2010 | Felton |
| 2011/0272250 A1 | 11/2011 | Devries |
| 2013/0284565 A1 | 10/2013 | Kuiper et al. |

FOREIGN PATENT DOCUMENTS

| | | |
|---|---|---|
| FR | 2586235 A1 | 2/1987 |
| GB | 608907 | 9/1948 |
| WO | 9741051 A1 | 11/1997 |
| WO | 2009016484 A1 | 2/2009 |
| WO | 2011005091 A2 | 1/2011 |

OTHER PUBLICATIONS

"Persuader PT Max Belt Trainer" issued by Flexible Steel Lacing Company, Aug. 2001 (2 pages).

"Persuader PT Smart Belt Trainer Instructions for Installation" issued by Flexible Steel Lacing Company, Feb. 2001 (4 pages).

"Persuader Trainers and Positioners Selection Guidelines" issued by Flexible Steel Lacing Company, Feb. 2001 (2 pages).

"PT Max Belt Trainer Top Side and Return Side Instructions for Installation" issued by Flexible Steel Lacing Company, Jul. 2008 (4 pages).

"PT Max Belt Trainers" issued by Flexible Steel Lacing Company, Feb. 2008 (2 pages).

"PT Max Belt Trainers" issued by Flexible Steel Lacing Company, Jun. 2011 (2 pages).

"PT Max Return Side Data Sheet" issued by Flexible Steel Lacing Company, Jun. 2009 (1 page).

"PT Max Roller Data Sheet" issued by Flexible Steel Lacing Company, Jun. 2009 (1 page).

"PT Max Top Side Data Sheet" issued by Flexible Steel Lacing Company, Jun. 2009 (1 page).

"PT Max V-Return Side Data Sheet" issued by Flexible Steel Lacing Company, Jun. 2009 (1 page).

Notification of Transmittal of the International Search Report and the Written Opinion of the International Searching Authority, or the Declaration from the International Bureau of WIPO for International Application No. PCT/US16/61531, dated Feb. 16, 2017, 14 pages.

Notification of Transmittal of the International Search Report and the Written Opinion of the International Searching Authority, or the Declaration from the International Bureau of WIPO for related International Application No. PCT/US13/30034, dated Apr. 8, 2014, 15 pages.

Patent Examination Report No. 1 issued in related Australian Application No. 2013203168, dated Sep. 23, 2014, 6 pages.

* cited by examiner

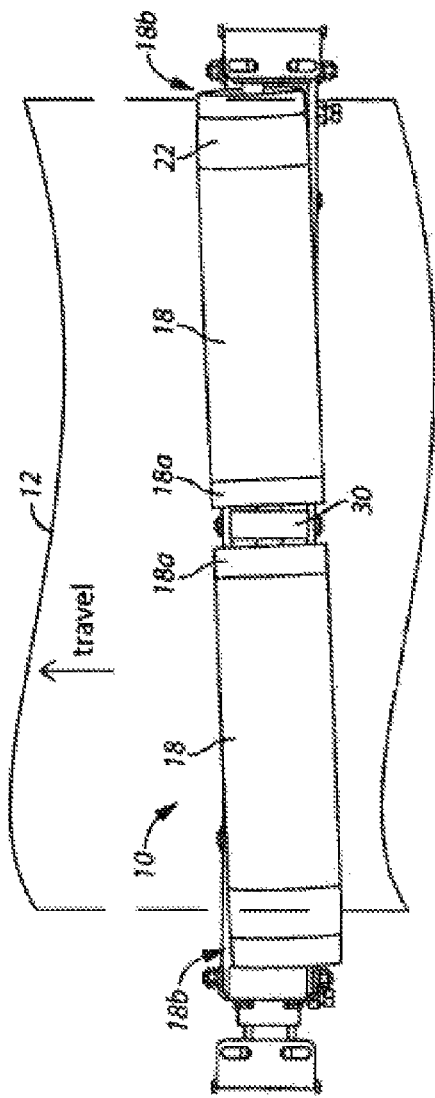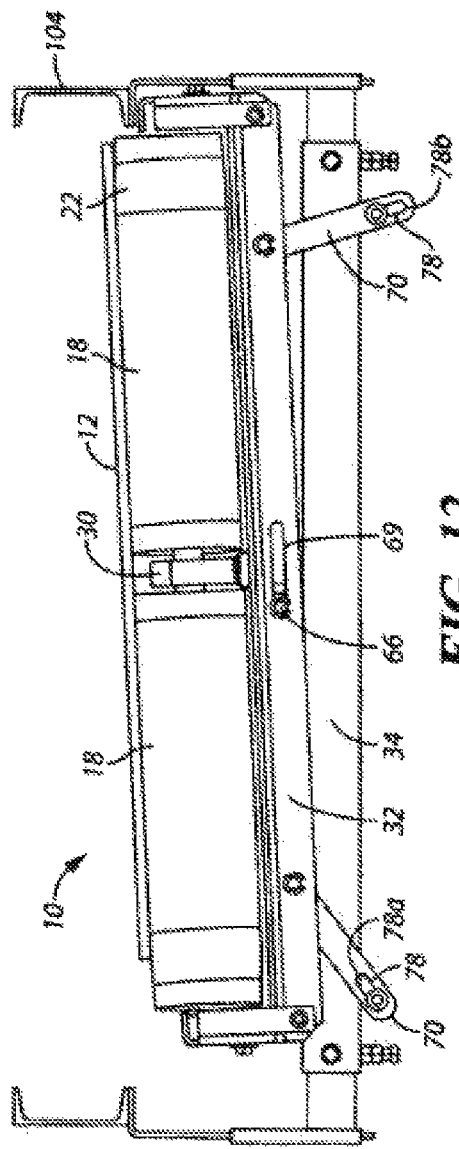

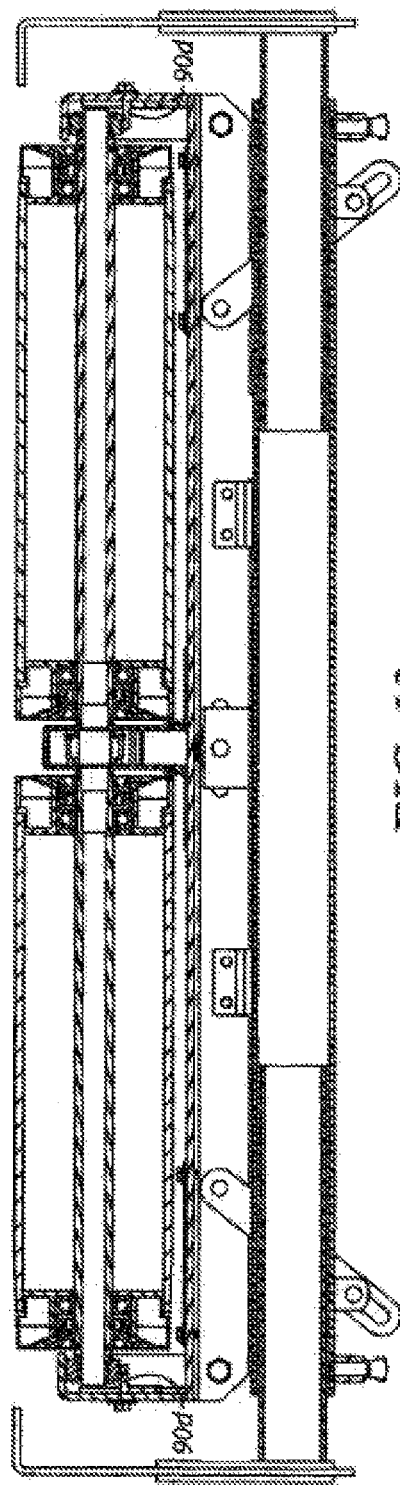

APPARATUS AND METHOD FOR TRACKING CONVEYOR BELTS

CROSS-REFERENCE TO RELATED APPLICATION

This application is a continuation of prior application Ser. No. 13/791,729, filed Mar. 8, 2013, which claims benefit under 35 U.S.C. §119 (e) to U.S. Provisional Application No. 61/608,333 entitled "Apparatus and Method for Tracking Conveyor Belts" filed Mar. 8, 2012. The contents of each patent application identified above is incorporated herein by reference in its entirety.

FIELD OF THE INVENTION

The invention relates to tracking apparatuses and methods for tracking conveyor belts.

BACKGROUND OF THE INVENTION

Rollers for conveyor belts are arranged so that the conveyor belt travels thereover in a downstream belt travel direction and path. However, conveyor belts can tend to meander or mistrack laterally toward one side or the other of the rollers due to reasons such as uneven loads carried by the belt. Conveyor belt tracking devices have been developed that respond to belt mistracking to attempt to redirect the belt back to its correct travel path substantially centered on the conveyor rollers.

One type of belt tracking device configured to correct a misaligned belt has sensor rollers that are mounted to arms that are each operationally connected to a frame for tracking or training rollers under a belt. If the belt becomes misaligned, it will forcefully engage the sensor roller at the misaligned side, which will cause the arms to force the belt training roller to pivot for steering the belt back toward its proper downstream travel path. However, the sensor rollers are generally located upstream or downstream of the training rollers to create the necessary moment arm for pivoting the rollers. This upstream or downstream mounting of the sensor rollers means that the correcting mechanism is limited to use when the belt travels in a single direction. Furthermore, this solution requires the edge of the belt to forcefully make contact with the sensor rollers, which can undesirably damage the belt.

One type of belt tracker that avoids the use of sensor rollers is disclosed in U.S. Pat. No. 6,405,854 to Cumberlege. The Cumberlege system includes a pair of rollers mounted to an elongate support shaft that is pivotable about its center relative to a support frame. The shaft includes a vertical post that pivots within a cylindrical bushing mounted to the support frame. The rollers include an outwardly decreasing taper at the outer ends, which operate to cause the rollers mounted to the elongate shaft to pivot in a horizontal plane about the vertical axis to steer a misaligned belt back toward its proper downstream travel path. The rollers can be mounted to the shaft either in a trough configuration or in a non-troughed or flat configuration. In the troughed configuration, the rollers pivot about the vertical axis while maintaining their orientation relative to the vertical pivot axis. This configuration is limited, however, because when the belt is in a flat configuration, the belt may become misaligned and include laterally outer portions that track off the end of the rollers, reducing the amount of contact between the belt and the rollers and reducing the effectiveness of the steering.

Another belt tracking device that avoids the use of sensor rollers has an inclined pivot axis of the rollers located upstream of the rollers. This belt tracker is disclosed in U.S. Pat. No. 2,225,276 to Parker and includes an idler roller that is pivotal about a pivot axis that is upwardly inclined in the downstream direction. In this regard, when a conveyor belt mistracks toward one end portion of the idler roller, the drag forces acting downstream on the idler roller end portion increase, urging the end portion to shift downstream, while the downstream tilt of the pivot axis causes the idler roller end portion to also shift downwardly under the increased weight of the mistracked belt passing over the end portion. Thus Parker's belt tracker utilizes the weight of the conveyor belt and drag forces acting on the end portion toward which the belt is mistracking to energize the idler roller to pivot about the pivot axis. However, the Parker belt tracker is limited because the tilt of the pivot axis restricts its use to belts that travel in a single direction.

Applicants' assignee herein also discloses a belt tracking apparatus in U.S. Patent Application Publication No. 2011/0272250 that has an inclined pivot axis. However, the pivot axis is located downstream of the idler tracking roller so that when the tracking roller pivots about the included pivot axis, the one end portion of the roller that shifts downstream will also shift upwardly for urging the mistracking belt back toward its correct travel path. The belt tracking apparatus of the '250 publication also relies on engagement between an edge of the belt and the corresponding one of the sensor rollers to generate the energizing force for pivoting the tracking roller so that its end portion is shifted downstream and upwardly. Further, because the tracking roller pivots about an inclined pivot axis, shifting of the roller end portion upwardly will be dictated by the angle of the inclination of the pivot axis and the amount of downstream shifting of the roller end portion. In other words, the inclination of the pivot axis defines a predefined relationship between the amount of downstream shifting of the tracking roller end portion and the amount of upward shifting thereof when the tracking roller is pivoted for correcting a mistracking conveyor belt. This can require that greater energizing force be generated from the sensor roller for actuating the pivoting of the tracking roller since it simultaneously has its end portion shifted both downstream and upwardly. In addition, the use of sensor rollers and an inclined pivot axis restricts use of the '250 publication tracking apparatus to conveyor belts that travel in a single direction.

SUMMARY OF THE INVENTION

A tracking apparatus and method for urging a mistracking conveyor belt back towards a correct travel path are provided. The apparatus and method both utilize downstream shifting of an end portion of an idler roller due to mistracking of the conveyor belt for directing or steering the belt back toward its correct travel path and a reaction force from the belt due to the steering thereof for energizing a tilting action of the idler roller to raise the downstream end portion thereof. In this manner, the tilting of the idler roller is not mechanically coupled to the downstream shifting of the roller end portion since it is the steering action that first generates the reaction force in the belt against the shifted idler roller which is used as the actuation or energizing force for tilting the idler roller. By mechanically separating the downstream shifting and tilting actions of the roller, an inclined pivot axis for the idler roller such as provided in prior belt tracking devices is avoided allowing the belt tracking apparatus herein to be bi-directional for use with conveyor belts that may be run in opposite travel directions.

Also, the energizing force for tilting the idler roller is independent of the energizing force for downstream shifting of the idler roller end portion thus allowing the tracking apparatus to generate an amount of tilting of the idler roller that is in proportion to the resistance of the belt being steered by the shifted idler roller. In other words, if the belt provides little resistance to being steered back toward its correct travel path by the shifted idler roller, then the idler roller will not be tilted to the same degree as when there is greater resistance by the mistracking belt to the steering action. In this instance, the tilting of the idler roller will be greater so that the tilted idler roller creates another influence on the mistracking belt, in addition to the steering action, that will urge it back towards it correct travel path.

In one aspect, a tracking apparatus is provided that includes at least one idler roller for supporting the conveyor belt and a frame assembly that is configured to operatively mount the idler roller to conveyor structure. The frame assembly is further configured to allow the idler roller to shift when the conveyor belt is mistracking so that one end portion of the idler roller is further downstream than the other end portion thereof for directing the belt back toward the correct travel path. The frame assembly is also configured to allow the idler roller to use a reaction force from the belt as the belt is being directed by the shifted idler roller to actuate the idler roller to be tilted for urging the belt back toward the correct travel path. Rather than defining a predetermined relationship between the amount of downstream shifting of the idler roller and the amount of upward shifting thereof as in prior tracking apparatuses, the tracking apparatus herein utilizes a reaction force from the belt as it is being directed by the idler roller that is shifted to have one of its end portions further downstream than the other end portion as the actuation force for tilting the idler roller for urging the belt back toward the correct travel path. In this manner, the tilting action of the idler roller is in proportion to the amount of resistance generated by the belt to the steering action undertaken by the shifted idler roller.

In another aspect, a bi-directional, self-energizing tracking apparatus for redirecting a mistracking conveyor belt back toward a correct travel path whether the conveyor belt is traveling in one direction or in an opposite direction is provided. The tracking apparatus has an idler roller device including a pair of outer idler rollers that support outer side portions of the conveyor belt, and a tilt device which mounts the idler roller device for shifting relative thereto. The outer idler rollers each include an outer end portion that tapers down toward a reduced diameter end thereof to cause the idler roller device to shift relative to the tilt device so that one of the outer idler rollers is further downstream than the other idler roller when the conveyor belt mistracks toward the one outer idler roller for steering the conveyor belt back toward the correct travel path. A base frame extends across the conveyor belt and is configured to be mounted to conveyor structure along the outer side portions of the conveyor belt. Linkage members interconnect the tilt device to the base frame for allowing the tilt device to tilt relative to the base frame upon receiving a reaction force from the conveyor belt when the idler roller device is shifted for steering of the mistracking conveyor belt so that the idler roller device is tilted and the downstream, one outer idler roller is raised relative to the other idler roller to urge the conveyor belt towards the correct travel path.

The self-energizing tracking apparatus does not rely on sensor rollers for generating either the actuation or energizing force for shifting of the idler rollers for steering the conveyor belt back towards the correct travel path or for tilting of the idler rollers for urging the conveyor belt back towards the correct travel path. Instead, it is the frictional engagement of the mistracking conveyor belt with the idler rollers that include tapered outer end portions that generates the actuation force for shifting thereof when the belt mistracks. In addition, the tilt device and the base frame are interconnected by linkage members such that when the idler rollers are shifted for steering the mistracking conveyor belt, a reaction force from the conveyor belt is received by the idler rollers which is used as the actuation force for causing the tilt device to tilt relative to the base frame. In this manner, the idler roller that is shifted further downstream due to mistracking the conveyor belt is also raised relative to the other upstream idler roller so that in addition to being steered back toward the correct travel path, the idler rollers are tilted to urge the conveyor belt back toward the correct travel path. Since the tracking apparatus does not need to employ sensor rollers for generating its energizing or actuation forces for shifting and tilting the idler rollers, the tracking apparatus is bi-directional in that it can be used without being reconfigured for correcting the travel path of the belt whether it is traveling in one direction or in a direction opposite to the one direction.

In one form, the idler roller device and the tilt device have a rotatable connection therebetween to allow the idler roller device to rotate relative to the tilt device. The rotatable connection can be in the form of a central pivot assembly that allows the idler roller device to pivot relative to the tilt device. Alternatively, the rotatable connection can be in the form of a central spherical bearing that allows the idler roller device to rotate relative to the tilt device.

In the form having the central pivot assembly, the tilt device can include a tilt frame member for extending across the conveyor belt. The tilt frame member pivotally carries the idler roller device thereon, and the central pivot assembly can include a pivot axis substantially normal to the tilt frame member and about which the idler roller device is pivotal. Because the pivot axis is not inclined, the tracking apparatus in this form has the ability to correct mistracking conveyor belts that travel in either of opposite travel directions relative thereto.

In one form, the idler roller device and the tilt device have rollers therebetween with the rollers rolling along the tilt device to provide low friction support to the idler roller device as the idler roller device shifts relative to the tilt device and as the tilt device tilts the idler roller device.

In another form, the idler roller device and the tilt device have stops therebetween that limit the shifting of the idler roller device relative to the tilt device by a predetermined amount.

In one form, the tilt device is hung from the base frame via the linkage members such that the linkage members are in tension. Alternatively, the tilt device is supported in an elevated orientation relative to the base frame such that the linkage members are in compression.

In another form, the idler roller device includes an idler roller frame, the tilt device includes a tilt frame member to which the idler roller frame is pivotally mounted, the base frame includes spaced lateral support members, and the linkage members pivotally interconnect the tilt frame member to the spaced lateral support members so that the tilt frame member and the idler roller frame are generally between the spaced lateral support members with the tilt frame member hanging from the lateral support members to extend generally therebelow and the idler roller frame pivotably mounted to the tilt frame member to extend generally above the lateral support members.

The idler roller device can include a central idler roller, and the idler roller frame can be configured to adjustably orient the outer idler rollers at a selected upward incline relative to the central idler roller for supporting a troughed upper run of the conveyor belt.

In another aspect, a method for urging a mistracking conveyor belt back toward a correct travel path is provided including mounting idler rollers having tapered outer end portions under outer side portions of the conveyor belt, shifting the idler rollers so that one of the idler rollers is further downstream than another idler roller in response to conveyor belt mistracking toward the one idler roller due to greater engagement of the corresponding belt outer side portion with the tapered outer end portion of the one idler roller, steering the conveyor belt back toward the correct travel path with the shifted idler rollers, tilting the idler rollers so that the one idler roller that has been shifted downstream is raised relative to the other idler roller in response to a reaction force received from the conveyor belt being steered by the idler rollers, and urging the conveyor belt to generally shift in a lateral direction away from the raised, one idler roller back towards the correct travel path due to the tilting of the idler rollers.

BRIEF DESCRIPTION OF THE DRAWINGS

FIG. 11 is a plan view of the belt tracking apparatus in a fully shifted position with the belt mistracking to the right lateral side showing the rollers pivoted so that the right lateral portions thereof are further downstream than shown in FIG. 9;

FIG. 12 is an elevational view of the belt tracking apparatus in the fully shifted position of FIG. 11 showing the tilt channel of the roller assembly pivoted or tilted up so that the right lateral portions thereof are tilted higher than shown in FIG. 10;

FIG. 13 is a cross-sectional elevational view of an alternative embodiment of the belt tracking apparatus of FIGS. 1-12 showing a lower flange member mounted to the upstanding retainer bracket and located below the exterior bearing;

DETAILED DESCRIPTION OF THE PREFERRED EMBODIMENTS

Figure 1:
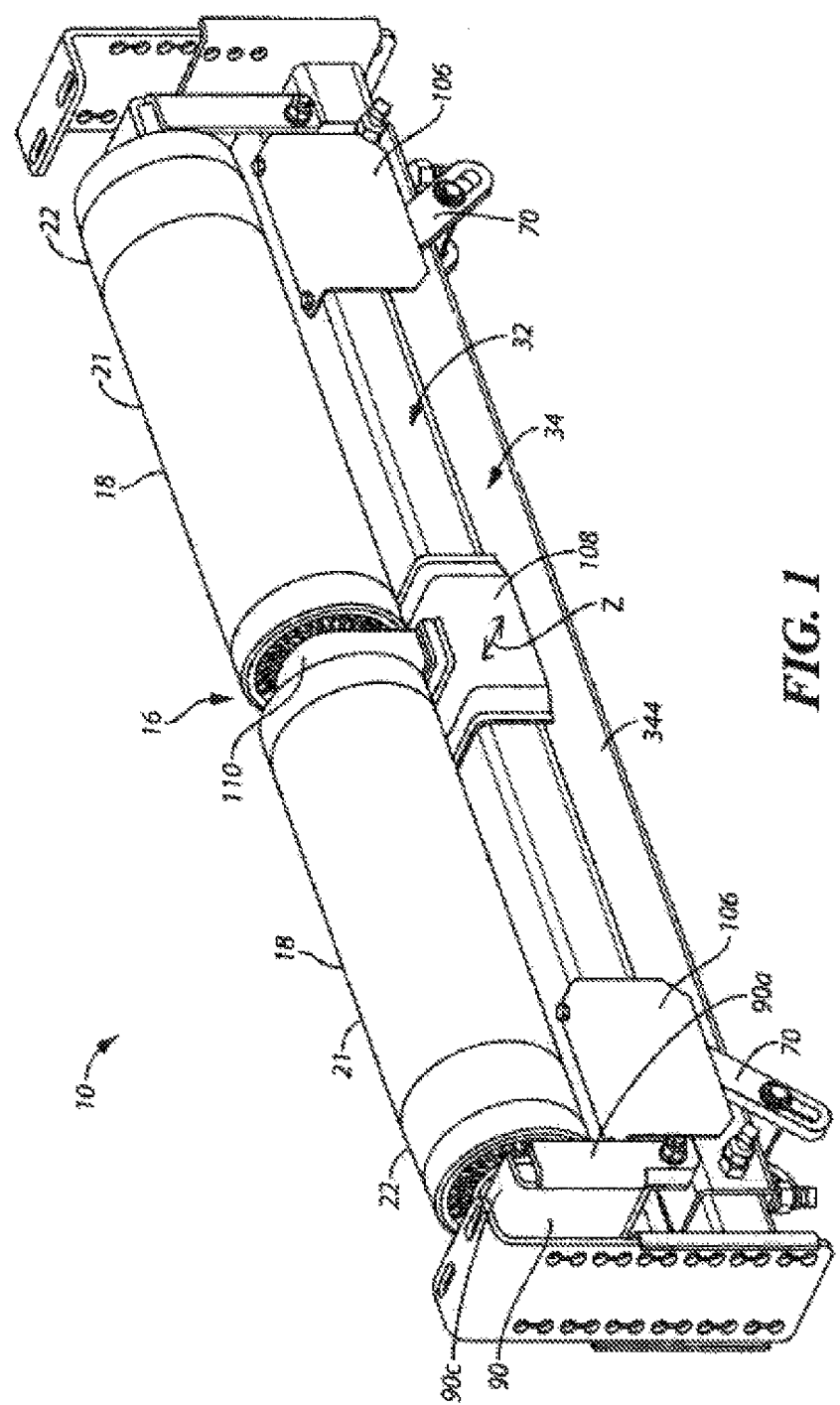
FIG. 1 is a perspective view of a belt tracking apparatus in accordance with the present invention showing a roller assembly mounted to a tilt channel device that is, in turn, mounted to a support frame.
Figure 2:
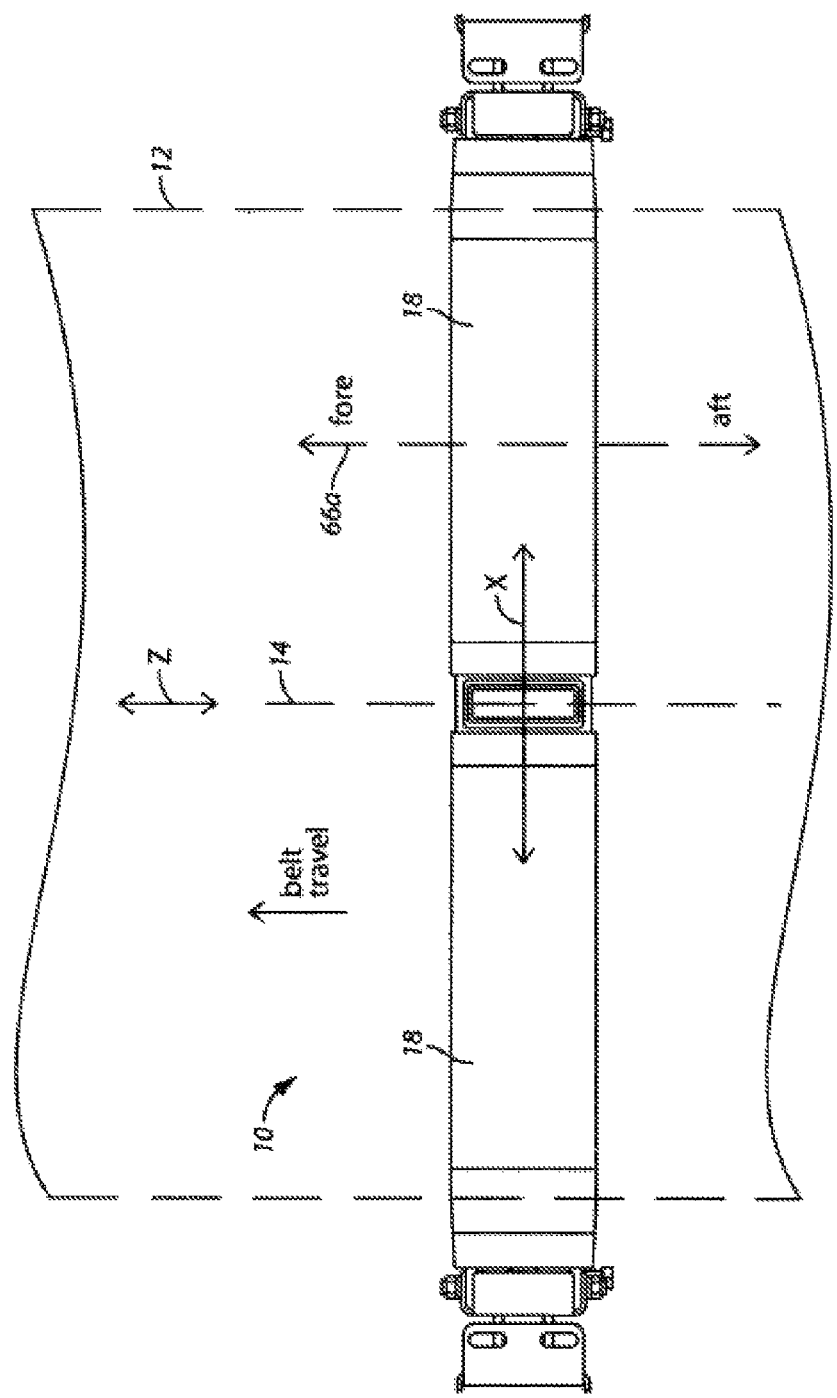
FIG. 2 is a plan view of the belt tracking apparatus of FIG. 1 showing the apparatus in a neutral position with a pair of rollers of the roller assembly extending laterally orthogonal to the belt travel direction.
Figure 3:
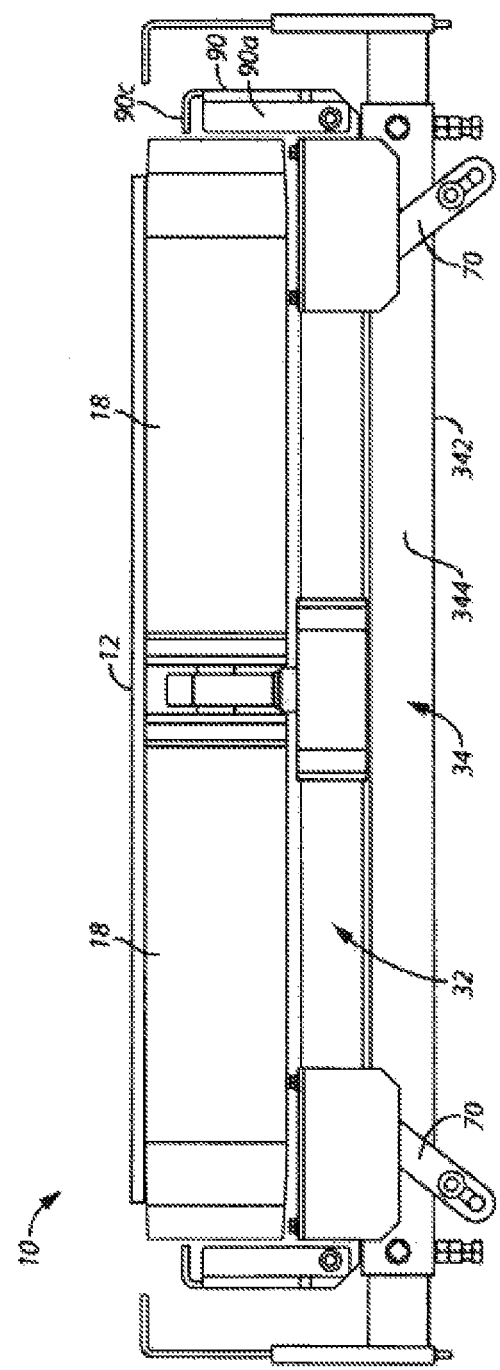
FIG. 3 is an elevational view of the belt tracking apparatus of FIG. 1 in the neutral position showing the tilt channel device in a non-tilted orientation relative to the support frame.

As illustrated in FIGS. 1-12, a conveyor belt tracking apparatus 10 is adapted to be used with an endless conveyor belt system positioned under a conveyor belt 12 thereof to track the belt 12 along a generally longitudinal belt travel path, the center of which is indicated at broken line 14 in FIG. 2. To this end, the belt tracking apparatus 10 will be described with respect to correcting lateral misalignment of the belt 12 relative to the center line 14. The belt tracking apparatus 10 is generally symmetrical such that the structure and function and of the apparatus 10 on one lateral side will be applicable to the opposite side as well.

As shown in FIGS. 1-4, the belt tracking apparatus 10 includes a roller assembly 16 having a pair of rollers 18, with each roller 18 being mounted for rotation on an elongate shaft 20 extending therethrough. The rollers 18 each include a cylindrical main portion 21 and a tapered outer end portion 22. The tapered outer end portion 22 has an outwardly decreasing diameter relative to the main portion 21.

The shafts 20 are coupled to a center coupling member 24 having a spherical portion or bearing 26 at the center thereof. The spherical bearing 26 is received within a spherical socket 28 of a housing 30 to provide a universal type joint therebetween such that the coupling member 24 can rotate and swivel about a plurality of axes relative to the housing 30 for optimized adjustability of the orientation of the roller assembly 16 during conveyor belt operations. Thus, rather than pivoting about a single, fixed vertical axis, the roller assembly 16 can undertake compound rotating or swiveling motion.

The housing 30 is fixedly mounted to an elongate tilt channel device 32 generally centrally along the length thereof. The tilt channel device 32 is mounted to a support frame 34 so that the tilt channel device 32 can shift and tilt relative to the support frame 34. The support frame 34 is adapted for mounting to the frame structure of the endless belt conveyor system.

The roller assembly 16 is thus capable of compound rotary motion relative to the housing 30 and tilt channel device 32, with the tilt channel device 32 being capable of translation and tilting relative to the support frame 34. The rotary motion of the roller assembly 16 and the translation and tilting of the tilt channel device 32 combine to urge the belt 12 back toward the center to correct a misalignment in the event the belt 12 becomes misaligned to one side. As will be described in further detail below, the self-correcting ability of apparatus 10 can be accomplished without requiring the belt 12 to actively contact sensor rollers to force a change in orientation of the rollers 18. This form of belt correction is known as "self-energizing," and preserves the integrity of the belt edges more effectively than the non self-energizing types of belt trackers that require contact with sensor rollers or the like. Furthermore, the symmetrical nature of the apparatus 10 allows for the apparatus to be used with a belt travelling in both a first longitudinal belt travel direction and a reversed longitudinal direction opposite the first direction.

It should be noted that the term "symmetrical" refers to the general orientation of the components of the apparatus 10 when the apparatus is in a neutral position, and refers to the symmetry on the left and right side of a central longitudinal axis Z that is generally parallel to the direction of belt travel, as well the symmetry on the fore and aft side of a lateral axis X that is generally parallel to the length of the support frame 34. As will be described in further detail, when the belt 12 becomes misaligned to one side, the roller assembly 16 will rotate about its connection to the housing 30, which ultimately causes the tilt channel device 32 to translate laterally to the side of the misalignment relative to the support frame 34. However, the housing 30 and tilt channel device 32 do not become offset in the longitudinal direction of the travel of the belt 12. In such a condition, the overall apparatus 10 will no longer be symmetrical, but will return to its symmetrical orientation after the belt 12 has returned to its intended path of travel. The symmetrical orientation allows for correcting the belt 12 in the same manner regardless of the direction of travel of the belt 12 or the particular side to which the belt 12 becomes misaligned.

Furthermore, the terms "lateral" or "laterally" refer to a lateral direction along the axis X. The terms "fore," "forward," "aft," and "rearward" refer to a longitudinal direction along the axis Z, and relative to the direction of belt travel, so that forward refers to the direction of belt travel and rearward refers to the direction opposite belt travel.

Figure 4:
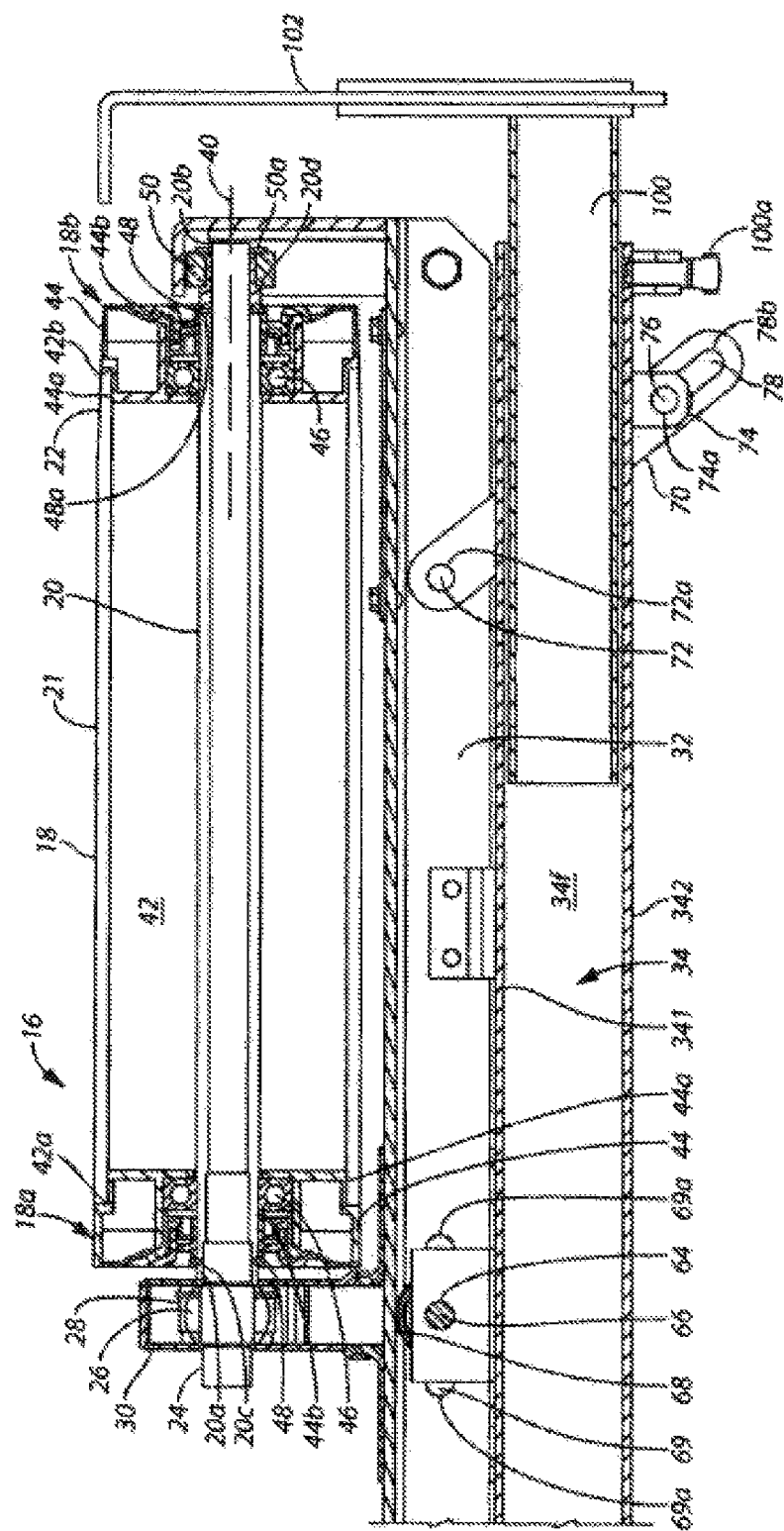
FIG. 4 is a partial cross-sectional view showing the interior of one of the rollers and a spherical bearing connection between the roller assembly and the tilt channel device.

One of the rollers 18 of the roller assembly 16 is shown in further detail in FIG. 4. As previously mentioned, the apparatus 10 and the roller assembly 16 are generally symmetrical, so the description of one roller 18 will correspond to the other roller 18, as well. The roller 18 is mounted for rotation to the shaft 20, with an axis 40 of rotation for the roller 18 running along the central axes of both the roller 18 and the shaft 20. The roller 18 includes a laterally inboard end 18a and a laterally outboard end 18b. The rollers 18 have a cavity or bore 42 extending therethrough, through which the shaft 20 extends. The rollers 18 thus include an inboard opening 42a and an outboard opening 42b. Annular end cap assemblies 44 are mounted at both the inboard opening 42a and outboard opening 42b. The end cap assemblies 44 are sized such that the outer diameter of an inner portion 44a generally corresponds to the inner diameter of the openings 42a and 42b. The inner portion 44a is received within the openings 42a and 42b at each end of the roller 18. The end cap assemblies 44 also include an opening 44b through which the shaft 20 extends. The end cap assemblies 44 include a bearing 46. The bearing 46 is mounted between the end cap assembly 44 and the shaft 20 so that the rollers 18, with the end cap assemblies 44 mounted thereto, can rotate via the bearings 46 about the shaft 20. The bearings 46 are generally in the form of a ball bearing assembly or the like, but other types of rotatable bearings can also be used. The roller 18 is held in place axially by a pair of disc retainer members 48 that radially extend from the shaft 20. The disc retainer members 48 are disposed to the outside of the end cap assemblies 44, and may be snap fit in place in grooves 48a of the shaft 20.

The shaft 20 includes both an inboard end 20a and an outboard end 20b. The inboard end 20a includes annular sleeve connection portion 20c configured for being coupled with the center coupling member 24. An outer bearing 50 is mounted to the outboard end 20b of the shaft 20. The outer bearing 50 may have a generally annular ring shaped form. The outboard end 20b of the shaft 20 has a reduced outer diameter relative to the remainder of shaft 20 to form a radially extending shoulder surface 20d. The outer bearing 50 is held in place axially by a disc retainer member 50a, similar to the disc retainer members 48, and the shoulder surface 20d of the shaft 20. The outer bearing 50 may be a ring or wheel bearing that can rotate about the shaft 20, which will be further described below. The outer bearing 50 is preferably made from a low friction plastic material such as Acetal; however, other materials may also be used.

Figure 5:
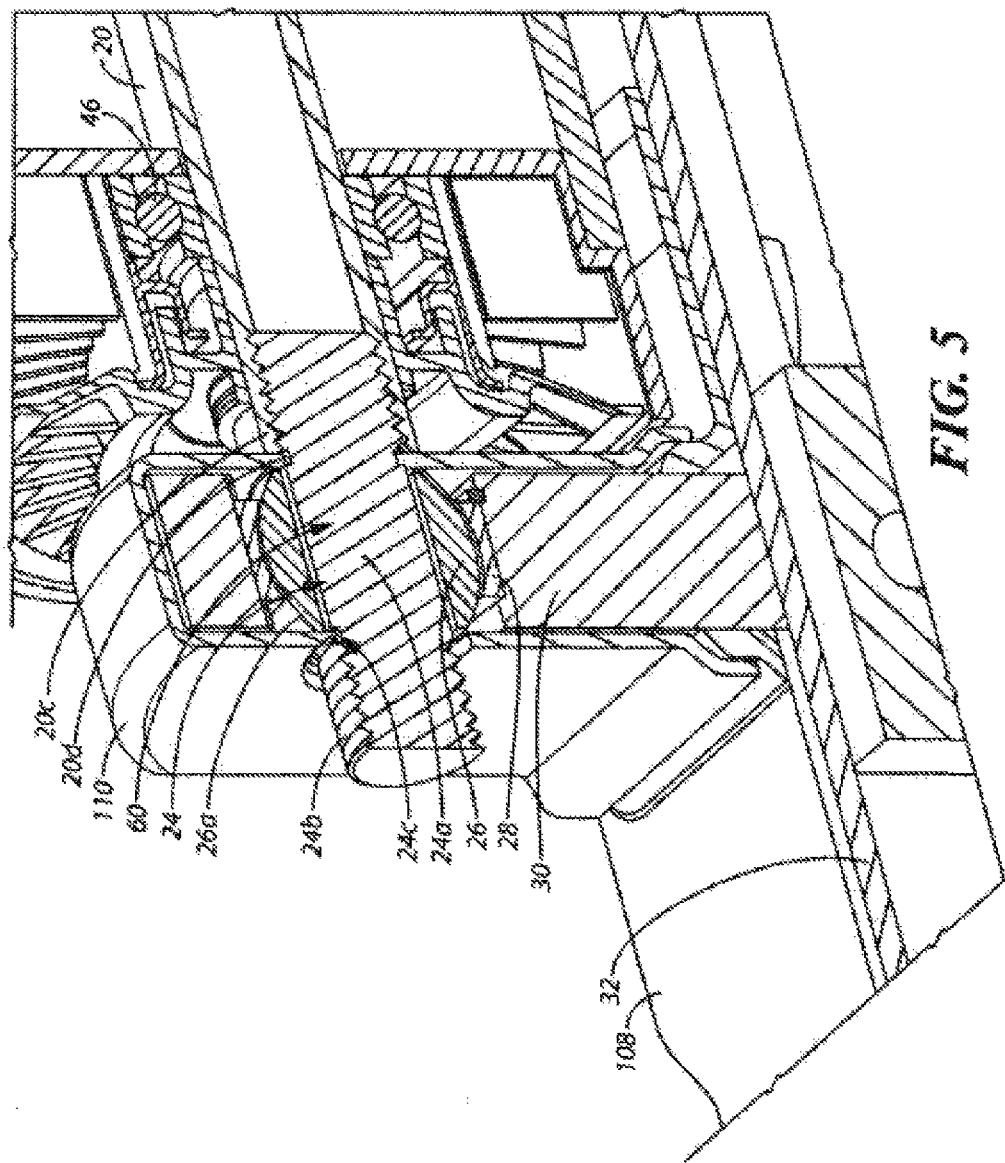
FIG. 5 is a partial cross-sectional view of the spherical bearing connection.

As shown in further detail in FIG. 5, the center coupling member 24 is in the form a shaft 24a with threaded opposite end portions 24b that are threaded into the annular sleeve connection portions 20c of the inboard end 20a of each shaft 20. An undercut portion 24c is formed in the shaft 24a that corresponds to the shoulder surface 20d when the roller shafts 20 are fully installed on the coupling member 24 to eliminate a stress concentration at the termination of the threads. The spherical bearing 26 includes a ball portion 26a having a through bore through which the shaft portion 24a extends. The spherical bearing 26 is received within the spherical socket member 28, which is fixedly mounted within the housing 30. The housing 30 is fixedly mounted to the tilt channel device 32 via a welding bead, and extends upwardly from the tilt channel device 32 at the center thereof. Thus, the rollers 18 are each ultimately mounted for rotary motion about a central spherical connection 60 formed by the interface between the spherical bearing ball portion 26a and the socket member 28, with the spherical connection 60 having a generally consistent location upward of the center of the tilt channel device 32.

The tilt channel device 32 is mounted to the support frame 34 to allow for translation of the elongate tilt channel device 32 along the fixed elongate support frame 34 therebetween. More specifically, and with reference to FIGS. 6 and 7, the tilt channel device 32 is connected to the support frame 34 at a plurality of locations. The tilt channel device 32 can include a channel member 321 having an inverted generally C-shape cross-sectional configuration. The channel member 321 has an upper wall 322 with depending leg portions 323 and 324 on either side thereof. The support frame 34 is in the form of a cross beam 34a having a tubular configuration with a generally rectangular cross-sectional configuration to include upper and lower walls 341 and 342 interconnected by opposite sidewalls 343 and 344. The cross-beam upper wall 341 has an upper surface 34b with a center mount portion 62 fixedly mounted thereto. The C-shaped configuration of the channel member 321 is configured so that the width of the upper wall 322 is wider than the width of the cross beam 34a, such that the depending leg portions 323 and 324 can tilt downward and past the cross beam upper wall 341 when the tilt channel device 321 becomes tilted. This position is illustrated in FIG. 12.

The center mount portion 62 includes an upstanding mounting block 62a having a through-hole 64 through which an axle 66 extends in a fore and aft direction 66a when the apparatus 10 is mounted to generally extend laterally under and across the belt 12. A pair of roller bearings 68 are mounted to the axle 66 both fore and aft of the center mount portion 62. The roller bearings 68 are configured to contact a lower surface 32a of the channel member upper wall 322 of the tilt channel device 32. Thus, when the tilt channel device 32 shifts or translates laterally along the support frame 34, the lower surface 32a of the channel member upper wall 322 will roll across the roller bearing 68. The tilt channel device 32 also includes a laterally extending slot 69 in each of the depending leg portions 323 and 324 through which the axle 66 extends. As the tilt channel device 32 shifts laterally, the axle 66 will ultimately contact one of end surface portions 69a of the slot 69 to limit the amount that the tilt channel device 32 can shift laterally relative to the support frame 34. In one form, the slot 69 has a length of about three inches; however, other lengths could also be used. The translation of the tilt channel device 32 along the support frame 34 shifts the roller assembly 16 so that it is no longer centered relative to the support frame 34. While this could impact the sensitivity of the belt tracking provided by the rollers 18, the tilt channel device 32 is also operable to generate tension in the belt 12 for correcting its travel path as described further below.

With reference to FIGS. 1, 3, 4, 8, and 9-12, the tilt channel device 32 is mounted to the support frame 34 via a linkage system which can include linkage bars 70 disposed at four locations. The linkage bars 70 are operable to cause the tilt channel device 32 to tilt relative to the support frame 34 in response to a lateral reaction force acting upon the tilt channel device 32 that is caused by the skewed orientation of the rollers 18 as further described below.

More specifically, the linkage system includes an upper pivot shaft that 72 extends in the fore and aft direction between the fore and aft depending leg portions 323 and 324 of the tilt channel device 32 and is mounted thereto via retaining rings 72a at the exterior surfaces of the fore and aft depending leg portions 323 and 324 of the tilt channel device 32. The upper shaft 72 is connected to the linkage bar 70 by extending through upper aperture 72a. The support frame 34 has a linkage lug 74 fixed thereto to depend from a lower surface 34c of the lower wall portion 342 of the support frame cross beam 34a and generally extending in the fore and aft direction generally between the sidewalls 343 and 344 of the support frame cross beam 34a. The linkage lug 74 includes a through aperture 74a through which a lower pivot shaft 76 extends. The lower shaft 76 is connected to the linkage bar 70 by extending through a slot 78 of the linkage bar 70. As shown, the upper shaft 72 is located above and inboard of the lower shaft 76. Thus, the linkage bar 70 extends upwardly and laterally toward the centerline 14 from the support frame 34 to the tilt channel device 32. There is a pair of linkage bars 70 located on either side of the centerline 14. One linkage bar 70 of each pair is located at the forward side of the support frame 34, with the other located at the rearward side of the support frame 34. When the tilt channel device 32 translates along the support frame 34 to the right, the right side linkage bars 70 will be put in compression, causing an upper end portion 78a of the slot 78 to contact the lower shaft 76, thereby causing the linkage bar 70 to rotate about the lower shaft 76. The rotation of the linkage bar 70 about the lower shaft 76 will cause the tilt channel device 32 to lift upwardly at the right side and become tilted relative to the support frame 34. This tilted orientation can be seen in FIGS. 10 and 12, as is discussed in further detail below. In one form, the length of the slot can be approximately 1.35 inches; however, other slot lengths can also be used.

Figure 6:
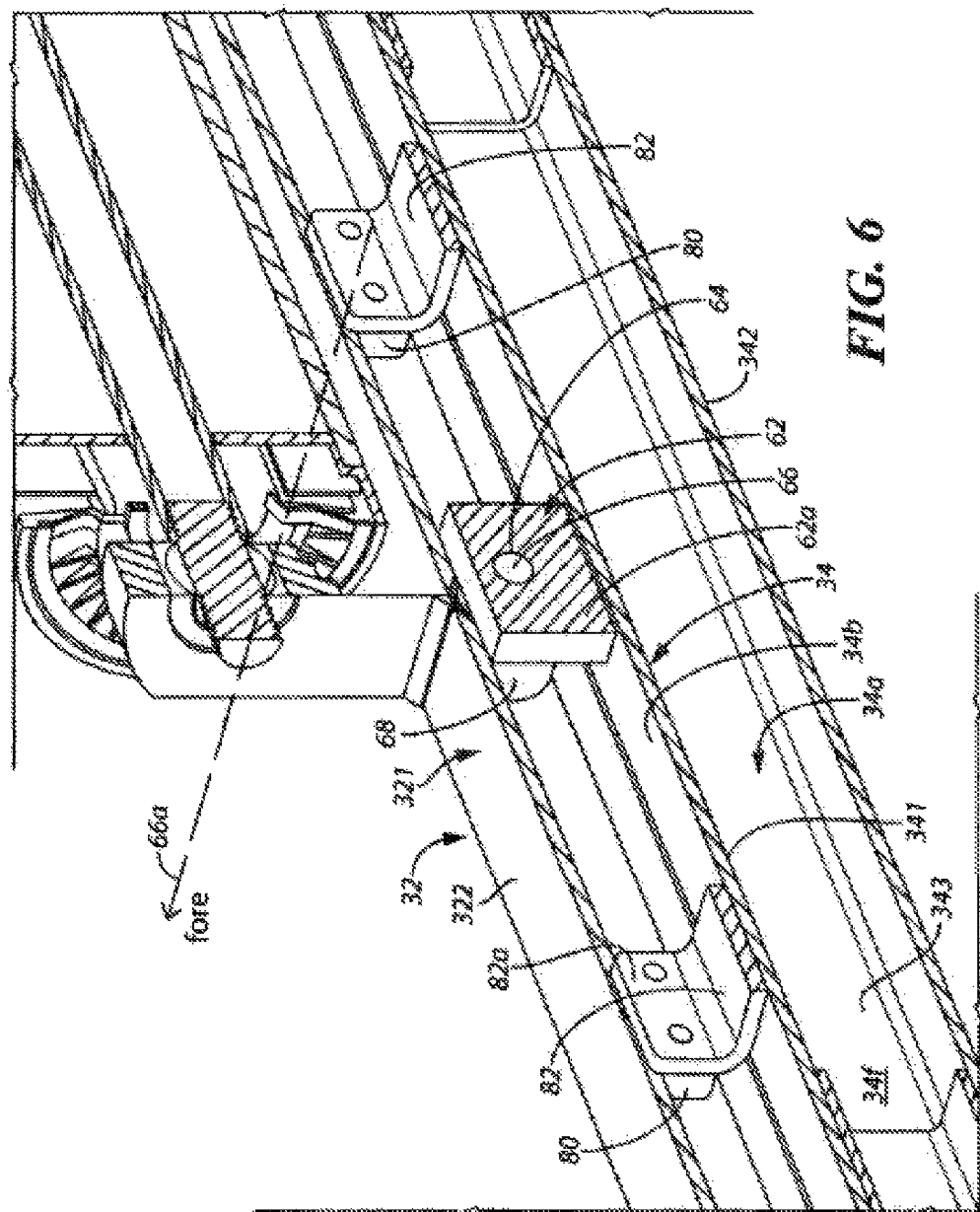
FIG. 6 is a partial cross-sectional view of the tilt channel device and the support frame showing a center mount therebetween.
Figure 7:
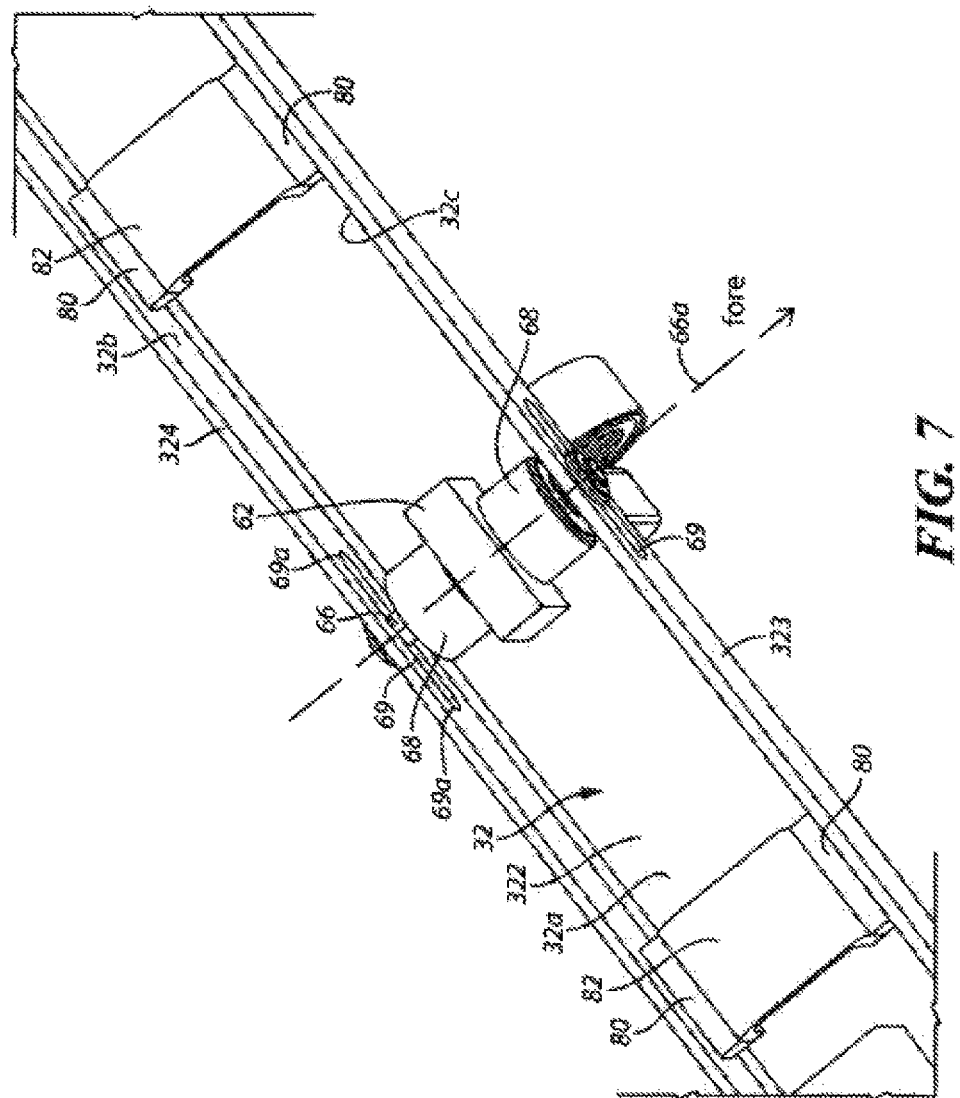
FIG. 7 is a bottom perspective view with the support frame removed showing the interior of the tilt channel device.

Additionally, and as illustrated in FIGS. 6 and 7, four guide blocks 80 are mounted to the support frame 34 via a pair of U-shaped brackets 82. The brackets 82 are fixedly mounted to the upper surface 34b of upper wall 341 of the support frame 34, similar to the center mount 62, symmetrically at both the right and left side of the centerline 14. The brackets 82 have a pair of upwardly extending mounting flanges 82a to which the guide blocks 80 are secured. One bracket 82 holds two guide blocks 80, one at the forward side thereof and one at the rearward side thereof. The guide blocks 80 are configured to fit between and slide along interior surfaces 32b and 32c of the fore and aft depending leg portions 323 and 324 of the tilt channel device 32 as the tilt channel device 32 travels along the support frame 34. The guide blocks 80 help to ensure that the tilt channel device 32 translates in the lateral direction and limits pivoting of the tilt channel device 32 relative to the support frame 34.

Figure 8:
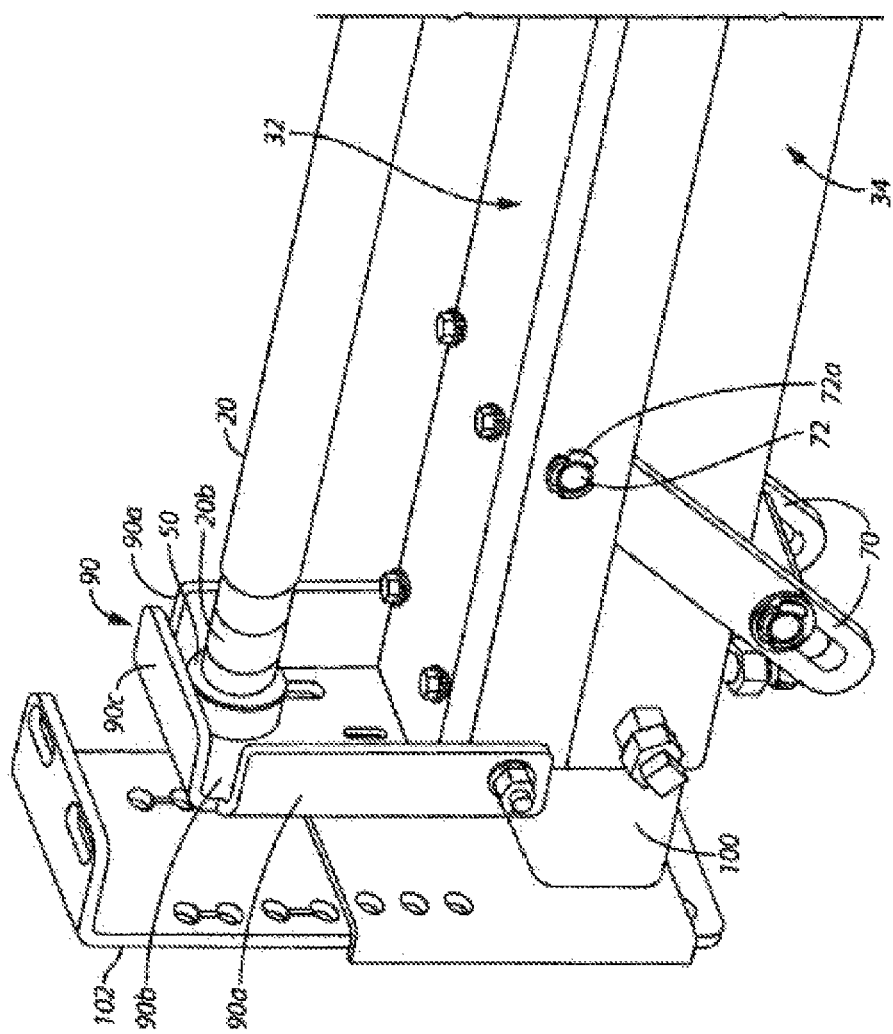
FIG. 8 is a perspective view with the roller removed showing an outboard end of a roller shaft having an exterior bearing and an upstanding retainer bracket member mounted to the end of the tilt channel device.
Figure 10:
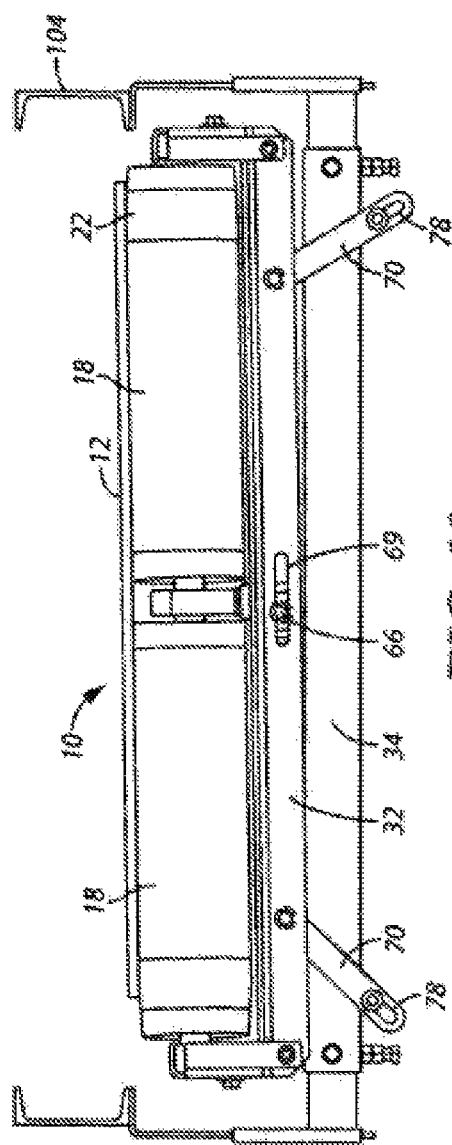
FIG. 10 is an elevational view of the belt tracking apparatus in the partially shifted position of FIG. 9 showing the tilt channel of the roller assembly pivoted or tilted up so that the right lateral portions thereof are tilted higher.

As shown in detail in FIG. 8, the tilt channel device 32 also has a pair of upstanding retainer bracket members 90 mounted at each end. The upstanding retainer bracket members 90 include a pair of upwardly extending sidewall portions 90a extending generally upwardly from the opposite ends of the tilt channel device 32 so that the sidewall portions 90a are disposed both fore and aft of the outer bearing 50. An end wall portion 90b extends in the fore and aft direction between the upwardly extending sidewall portions 90a. An inwardly extending upper flange portion 90c extends laterally inwardly toward the centerline 14 from the end wall portion 90b so that the flange portion 90c is disposed above the outer bearing 50 of the shaft 20. Thus, the outer bearing 50 has a fixed surface forward, rearward, and above. If the roller assembly 16 spherically rotates about the spherical connection 60 relative to the tilt channel device 32, the outer bearing 50 can contact the upwardly extending sidewall portions 90a or the inwardly extending upper flange portion 90c to restrict the amount of fore and aft movement or upward movement that occurs at the outboard end 20b of the shaft 20. As will be further discussed below, the upstanding retainer bracket members 90 bear a portion of the load in the apparatus 10 during operation. For example, when a downward load is exerted at the right side of the roller assembly 16 during a lateral misalignment of the belt 12 to the right, the roller assembly 16 will tend to tilt downwardly at the right side via the spherical connection 60, causing the left side to tend to tilt upwardly at the left side. However, the left side flange portion 90c that extends over the corresponding outer bearing 50 will stop the upward movement of the outer bearing 50 at the left side and will thereby provide support to the roller assembly 16, which will tend to limit the amount that the roller assembly 16 will tilt relative to the tilt channel device 32. As can be seen in FIGS. 10 and 12, when the tilt channel device 32 is tilted relative to the support frame 34, the axis of the roller assembly 16 will extend substantially parallel to the tilt channel device 32 along the length thereof.

The support frame 34 is configured for mounting to the belt conveyor system, as previously described. More specifically, and as shown in FIG. 8, the support frame 34 includes a pair of laterally outer telescoping portions 100 that are slidably received within a rectangular hollow bore 34f of the hollow cross beam 34a. The hollow bore 34f is defined by the upper and lower walls 341 and 342 and the sidewalls 343 and 344. The telescoping portions 100 are capable of sliding in the lateral direction in the bore 34f to adjust the width of the overall support frame 34. The telescoping portions 100 are frictionally held in place by a screw and jam nut combination 100a, although other known methods of securing a telescoping member can also be used. A mounting bracket 102 extends upwardly from the telescoping member 100 for mounting the apparatus to the conveyor belt system structure such as side stringer members 104 (FIGS. 10 and 12) that extend along either side of the belt 12.

Having described the structure of the belt tracking apparatus 10 above, the operation of the apparatus 10 is described below.

As previously described, the belt tracking apparatus 10 is mounted to the belt conveyor structure via the mounting brackets 102. The belt 12 is in the form of an endless belt having an upper carry run and a lower return run with the belt tracking apparatus 10 mounted below the lower return run of the belt 12. The apparatus 10 supports the belt 12 via contact with the roller assembly 16. When the center of the belt 12 is aligned along the centerline 14, the belt 12 will contact the generally cylindrical central portions 21 of each roller 18, while generally not contacting the tapered outer end portions 22. As the belt 12 is driven along its path, the contact between the belt 12 and the rollers 18 will cause the rollers 18 to rotate about their central axis. More specifically, the rollers 18 will rotate about the shafts 20 via the rotation of the bearings 46 that are housed in the end cap assemblies 44. While the belt remains generally centered on the centerline 14, the rollers 18 will rotate in a generally forward direction, and the rollers 18 will be oriented generally parallel to the support frame 34. With the belt 12 centered on the centerline 14, the rollers 18 may be referred to as being in the neutral position, which is shown in FIGS. 1-8.

In the neutral position, the tilt channel device 32 is also oriented generally parallel to the support frame 34 and rollers 18. The tilt channel device 32 is generally not translated or tilted relative to the support frame 34 as long as the apparatus 10 remains in its neutral position. The linkage bars 70 are each oriented at approximately the same angle relative to the center of the apparatus 10.

Figure 9:
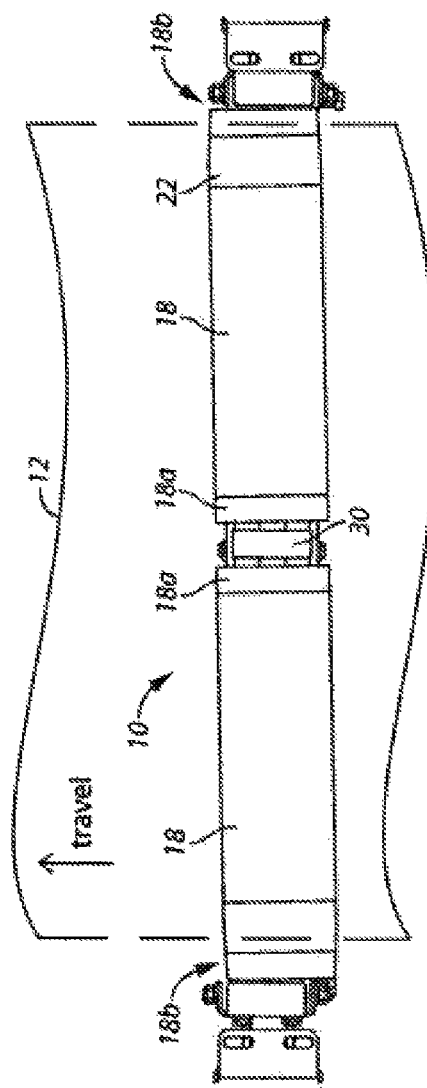
FIG. 9 is a plan view of the belt tracking apparatus in a partially shifted position with the belt mistracking to the right lateral side showing the rollers pivoted so that the right lateral portions thereof are pivoted further downstream.

As shown in FIGS. 9-12, in the event the belt 12 begins to track off center, or become misaligned, the belt tracking apparatus 10 will operate to urge the belt 12 back toward its centered position as further described below. As the belt tracking apparatus 10 is generally symmetrical, the operation of the correcting features of the apparatus 10 is generally the same whether the belt becomes misaligned to the right or the left. For purposes of illustration, the operation of the apparatus 10 will be described with respect to a lateral misalignment to the right. For reference, a right misalignment refers to the belt 12 becoming misaligned laterally to the right relative to the direction of the belt travel. While the description of the misalignment will be described with respect to a right misalignment, it will be appreciated that a misalignment to the left operates in the same manner. FIGS. 9 and 10 illustrate a partial misalignment of the belt 12 to the right. FIGS. 11-12 illustrate a larger misalignment of the belt 12 to the right, with the belt tracking apparatus 10 fully shifted, tilted, and rotated to correct the misalignment.

As the belt 12 begins to track off center and to the right, the frictional contact between the between the belt 12 and the right tapered outer end portion 22 of the right roller 18 will cause the roller assembly 16 to have its right distal end be pulled downstream in the direction of the travel of the belt 12, as described in further detail below. Because the device is rotating about the spherical connection 60 in the housing 30 to steer the belt 12 back to the left toward its intended path of travel, a reaction force from the belt 12 is generated to the right and transverse to the direction of belt travel. This causes the tilt channel device 32 to be translated to the right, with the linkage bars 70 causing the tilt channel device 32 to tilt upward at the right side against the bottom side of the belt 12.

As the tilt channel device 32 is pushed to the right, the tilt channel device 32 will shift relative to the support frame 34, which remains fixed to the conveyor structure. More specifically, the tilt channel device 32 will translate across the roller bearings 68 carried by the center mount portion 62, which is fixedly mounted to the support frame 34. Both the fore and aft roller bearings 68 will rotate as the tilt channel device 32 shifts.

With the tilt channel device 32 shifting to the right, the two linkage bars 70 located on the right of the apparatus 10 will be put in compression with the upper end surface portion 78a of the slot 78 being urged against the lower pivot shaft 76. The lateral force exerted at the upper shaft 72 will cause the linkage bar 70 to rotate about the lower shaft 76, thereby causing the upper shaft 72 to move upward as it moves to the right with the tilt channel device 32. This rotation and lifting at the linkage bars 70 occurs at both the fore and aft linkage bars 70 on the right. With the linkage bars 70 lifting the right end of the tilt channel device 32, the tilt channel device 32 thereby becomes tilted relative to the support frame 34 and the centrally located roller bearings 68. The roller bearings 68 continue to support the tilt channel device 32 when it is in this shifted and tilted orientation.

With the right side of the tilt channel device 32 lifted upward, the left side of the tilt channel device 32 thereby moves downward. At the left side of the tilt channel device 32, the linkage bars 70 at that location are pulled along as the tilt channel device 32 shifts to the right. More specifically, the lower pivot shaft 76 slides in slot 78, with the length of the slot 78 allowing the tilt channel device 32 to translate laterally from the left to the right. The linkage bar 70 will rotate slightly about the upper pivot shaft 72 as the left side of the tilt channel device 32 tilts downward. Thus, the linkage bars 70 at the left side have a more horizontal orientation than in the neutral position, while the linkage bars 70 at the right side have a more upright orientation. This orientation of the linkage bars 70 is shown in FIG. 12.

The length and orientation of the linkage bars 70 determines the amount of tilting as the tilt channel device 32 shifts. A relatively longer linkage bar 70 would result in a larger amount of lifting due to the increased radius and rotation about the lower shaft 76. Likewise, a shorter linkage bar 70 would result in a smaller amount of lifting. Furthermore, the length of the slot 69 operates to limit the maximum amount that the tilt channel device 32 can shift laterally, thereby limiting the maximum amount that the linkage bars 70 can lift the tilt channel as a result of the translation.

The amount that the tilt channel device 32 can translate to the right is limited by the laterally extending slot 69 and the axle 66 extending therethrough. As the tilt channel device 32 shifts to the right, the axle 66 will slide within the slot 69. As the tilt channel device 32 continues translating to the right, the axle 66 will contact the left end surface portion 69a of the slot 69, preventing additional shifting. Thus, the length of the slot 69 generally determines the maximum distance that the tilt channel device 32 can shift to either side. The longer the slot 69, the further the tilt channel device 32 can translate before the end surface portion 69a of the slot 69 contacts the axle 66. Likewise, a shorter slot 69 would limit the amount the tilt channel device 32 can translate. FIG. 12 illustrates the tilt channel device 32 having shifted its maximum amount to the right. In one form, the outermost end of the tilt channel device 32 at the raised end is approximately 1.75 inches higher than opposite lowered end of the tilt channel device 32 when the tilt channel device 32 has translated its maximum lateral distance.

Alternatively, the amount of translation could be limited by the length of the slot 78 in the linkage bar 70. The length of the slot 78 is generally long enough such that the lower pivot shaft 76 will not contact a lower end surface 78b of the slot 78 prior to the tilt channel device 32 shifting being stopped by the slot 69 and axle 66. However, the length of the slot 78 of the linkage bar 70 could be configured such that the lower pivot shaft 76 contacts the lower end surface 78b end of the slot 78 in the linkage bars 70 that are being pulled before the end surface 69a of the slot 69 contacts the axle 66.

With the tilt channel device 32 tilted due to the misalignment to the right, the downward gravitational force and the tension on the belt 12 caused by the tilting will tend to urge the belt 12 back to the left and toward the center. However, the apparatus 10 will also operate to correct the belt by rotating the roller assembly 16 via the spherical connection 60 so that the distal end of the roller 18 at the side of the misalignment is dragged forward along the direction of the travel of the belt 12, as further described below.

As previously described, when the belt 12 is travelling along its intended path and centered on the roller assembly 16, the belt 12 contacts and is supported by the rollers 18. When the belt 12 becomes misaligned to one side, the misaligned side of the belt 12 will contact more of the tapered outer end portion 22 of the roller 18 at that side, causing the outboard end 18b of the roller 18 to be pulled forward or downstream along the direction of belt travel.

More specifically, as the rollers 18 are rotating about their axes in response to the belt 12 travelling across the top of the belt tracking apparatus 10, each roller 18 has a given rotational velocity. However, the linear velocity of the roller 18 at the cylindrical main portion 21 is greater than the linear velocity at points on the tapered outer end portion 22 due to points on the tapered outer end portion 22 having a decreased diameter relative to the cylindrical main portion 21.

The belt 12 is traveling at a generally constant speed across its width, which generally corresponds to the linear velocity of the cylindrical main portion 21. When the belt 12 becomes misaligned to the right, the belt 12 will still be travelling at its previous linear speed. However, the points along the tapered outer end portion 22 are travelling at a linear speed that is less than the belt 12. Thus, when the belt 12 contacts the tapered outer end portion 22 on the right side, the belt will pull the tapered outer end portion 22 in the direction of the belt travel. As a result, the outboard end 18b of the roller 18 on the right side moves forward or downstream. With the roller assembly 16 mounted at its center to the spherical connection 60, the roller assembly will thereby rotate about the spherical connection 60 so that when the roller 18 on the right moves forward, the roller 18 on the left moves rearward. This results in the rotational direction of the rollers 18 being directed toward the left. The rollers 18 will exert a leftward force on the belt 12 in this orientation, thereby causing the belt 12 to move to the left toward its centered position and, as previously described above, the belt 12 will exert a reaction force to the right transverse to the direction of the travel of the belt 12, which causes the tilt channel device 32 to translate to the right, with the linkage bars 70 operating to lift the right side of the tilt channel device 32. FIGS. 9 and 10 illustrate a partial rotation of the roller assembly 16 with the belt 12 partially shifted to the right. FIGS. 11 and 12 illustrate a larger amount of rotation of the roller assembly 16 with the belt 12 shifted further to the right.

As the belt 12 moves back to the left, the belt 12 will travel off of the tapered outer end portion 22, and the direction of the belt travel will tend to re-orient the rollers 18 so that the rollers 18 are rotating in the direction of belt travel and the belt 12 will run along its intended path. In the event the belt 12 shifts too far to the left as it is being corrected from its misalignment to the right, the belt 12 will contact the tapered outer end portion 22 of the left roller 18, causing the left side roller 18 to be pulled forward, thereby correcting the belt 12 in a similar manner to that described above.

The amount that the roller assembly 16 will be able to rotate about the spherical connection 60 is limited by the upstanding retainer bracket members 90 mounted on the tilt channel device 32. As previously described, the upstanding retainer bracket members 90 include upwardly extending sidewall portions 90a that are located both forward and rearward of the outer bearing 50 that is mounted at the outboard end 20b of the shaft 20. As the roller 18 is pulled forward at the side of the misalignment, the outer bearing 50 translates in the forward direction. When the outer bearing 50 contacts the forward upwardly extending portion 90a, the roller 18 will become restricted from further forward travel and thereby restricted from further rotation about the spherical connection 60. Thus, the interface between the outer bearing 50 and the upwardly extending portion 90a prevents the roller assembly 16 from being pulled too far forward by the misalignment. In addition to the outer bearing 50 being stopped when moving in the forward direction at the side of the misalignment, the outer bearing 50 at the opposite side of the roller assembly 16 is also stopped from moving in the rearward direction. Thus, as the roller assembly 16 rotates in both directions during misalignments to both the right and the left, the outer bearings 50 at each side will move forward and rearward in response to the rotation, and contact the upwardly extending sidewall portions 90a both forward and rearward.

When the roller assembly 16 rotates about the spherical connection 60 so that the outboard end 18b of the roller 18 moves forward or rearward and contacts the upstanding retainer bracket members 90, the rollers 18 thereby exert a force on the upstanding retainer bracket members 90, which are mounted to the tilt channel device 32. This force is therefore transferred to the tilt channel device 32. Thus, when the roller 18 on the right side of the apparatus 10 moves forward, and the roller 18 on the left side moves rearward, these forces would tend to cause the tilt channel device 32 to rotate about the center in the same direction. However, the tilt channel device 32 is restricted form such rotation by the guide blocks 80 that are fixedly mounted to the support frame 34. Thus, the tilt channel device 32 will be generally stopped from rotation, and generally limited to translating and tilting, as previously described.

As mentioned previously, the roller assembly 16 is mounted via a spherical connection 60 to the tilt channel device 32. The spherical connection 60 allows for polyaxial adjustment and orientation of the roller assembly 16 relative thereto. As such, the roller assembly 16 is not limited by its connection at the center of the apparatus 10 to merely pivoting about a vertical axis. Rather, the spherical connection 60 allows for adjustment about multiple axes of rotation. The spherical connection 60 reduces the strain at the center of the apparatus 10 relative to a typical pivot connection. When the belt 12 becomes misaligned to the right, there is additional weight on the right roller 18. Because of the spherical connection 60, the roller 18 will tend to tilt downward due to the additional weight on the right side relative to the left side. This potential downward tilt is limited by the outer bearing 50 and the upstanding retainer bracket member 90. As previously described, the upstanding retainer bracket member 90 includes an inwardly extending upper flange portion 90c that is disposed above the outer bearings 50 on each side of the apparatus 10. Thus, when the roller 18 on the right side is forced downward due to increased weight, the roller 18 on the left side will be urged upward. The outer bearing 50 at the left side of the roller assembly 16 will translate upward and contact the inwardly extending upper flange portion 90c limiting the upward movement. The gap between the outer bearing 50 and the inwardly extending upper flange portion 90*c* is small when the rollers 18 are in the neutral position, so the amount that the roller 18 will tilt relative to the spherical connection 60 is thereby small, as well. However, rather that supporting the increased load caused by the misaligned belt 12 at a central connection like a typical pivot connection, the spherical connection 60 allows the load to be supported at both the spherical connection 60 and the outer bearing 50 and inwardly extending upper flange portion 90*c* connection at the opposite side. Furthermore, while the outer bearing 50 may be contacting the inwardly extending upper flange portion 90*c*, the outer bearing 50 can still rotate about the shaft 20 to move forward and rearward by rolling across the upper flange portion 90*c*.

In another form, the upstanding retainer bracket members 90 may include an inwardly extending lower flange member 90*d* (FIG. 13) mounted to the upstanding retainer bracket member and operating similarly to the inwardly extending upper flange portion 90*c*. The inwardly extending lower flange portion 90*d* can operate similarly to limit the tilting of the roller assembly 16 relative to the tilt channel device 32. Instead of counteracting a load at the right with the left side outer bearing 50 contacting the inwardly extending upper flange 90*c* at the left, a load at the right side can be supported by the right inwardly extending lower flange 90*d*, which is located below the outer bearing 50. As a force is applied the right, the outer bearing 50 at the right side will tend to cause right side of the roller assembly 16 to tilt downward, but the inwardly extending lower flange portion 90*d* will contact the outer bearing 50, limiting the tilt and supporting the right roller 18 at its outboard end 18*b*.

The apparatus 10 also includes linkage bar shield members 106 that are fixedly mounted to the tilt channel device 32 that help to protect the connection between the upper pivot shaft 72 and the aperture 72*a* from dirt or other debris. Similarly, central shield member 108 is fixedly mounted at the center of the tilt channel device 32 to help protect the interface between the slot 69 and axle 66 from dirt and other debris. A housing shield member 110 is mounted over the housing 30 at the center of the tilt channel device 32 and sized to correspond to the general shape of the housing member 30. In one form, the housing member is made from a urethane material or the like that is generally flexible, but other materials could also be used.

Thus, the belt tracking apparatus 10 described above operates to correct a belt misalignment by tilting the roller assembly 16 via the translation and tilting of the tilt channel device 32, and also by rotating the roller assembly 16 about the spherical connection 60 to direct the belt 12 back toward center. This combined tilting and rotation of the roller assembly 16 provides a robust solution to conveyor belt systems that become misaligned. The correcting features of tilting and rotating are caused by the contact between the belt 12 and the rollers 18, and do not require the edge of the belt 12 to contact any sensor rollers to cause the correction as in other configurations.

A further benefit of the belt tracking apparatus 10 is achieved by the symmetrical nature of the configuration. Because the apparatus 10 is symmetrical about its center while in the neutral position, the apparatus 10 can be installed on a conveyor belt system and operate on a belt 12 traveling in both a forward and rearward direction. The housing 30 having the spherical connection 60 is fixedly mounted at the center of the tilt channel device 32, extending upwardly therefrom. As the apparatus 10 adjusts to provide the self-energizing correction of the misalignment, the housing 30 and spherical connection 60 remain generally at the same longitudinal position relative to the direction of the travel of the belt 12, with the roller 18 remaining symmetrically disposed about the spherical connection 60. This means that the belt tracking apparatus 10 is reversible. The belt 12 may be run in a first longitudinal belt travel direction to carry its payload in that direction, and may be subsequently reversed to deliver payload in the opposite direction. The belt tracking apparatus 10 may be installed at various points along the conveyor system without regard to the intended direction of the belt 12.

Figure 14:
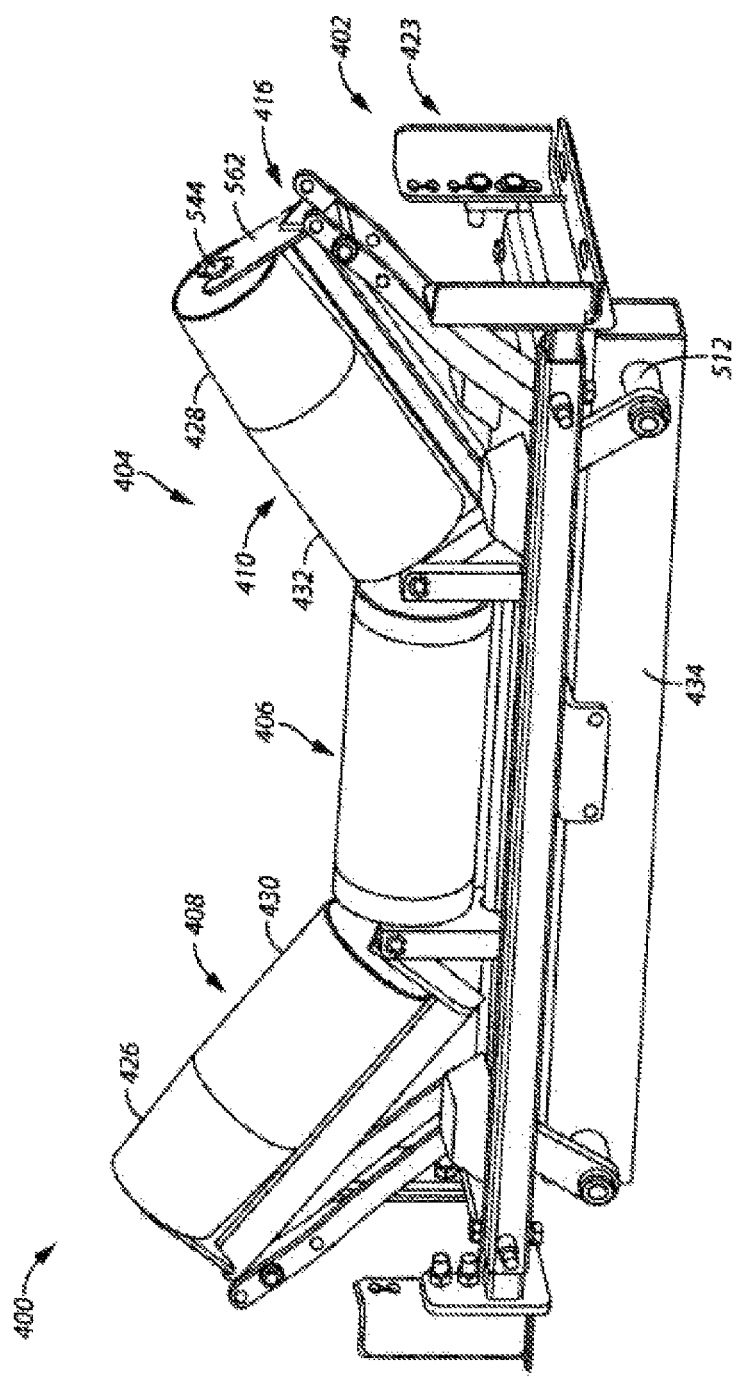
FIG. 14 is a perspective view of an alternative belt tracking apparatus showing idler rollers including inclined, tapered outer idler rollers that are supported in a troughed configuration by a frame assembly configured for allowing for shifting and tilting of the idler rollers when an upper, carry run of a conveyor belt is mistracking.

An alternative conveyor belt tracking apparatus 400 is shown in FIG. 14. As can be seen, the apparatus 400 includes a frame assembly, generally designated 402 (see FIG. 15), configured to support idler rollers 404 and operatively mount the rollers 404 to conveyor belt structure such as the previously described side stringer members 104. The idler rollers 404 of the apparatus 400 are shown arranged in a troughed configuration so that there is a lower center idler roller 406 disposed between the outer idler rollers 408 and 410 on either side of the center roller 400 that extend at an upper incline therefrom. The troughed configuration of the idler rollers 404 is for supporting an upper run 412 of a conveyor belt 414 as depicted in FIGS. 25 and 26 that is troughed for transporting material thereon.

Figure 25:
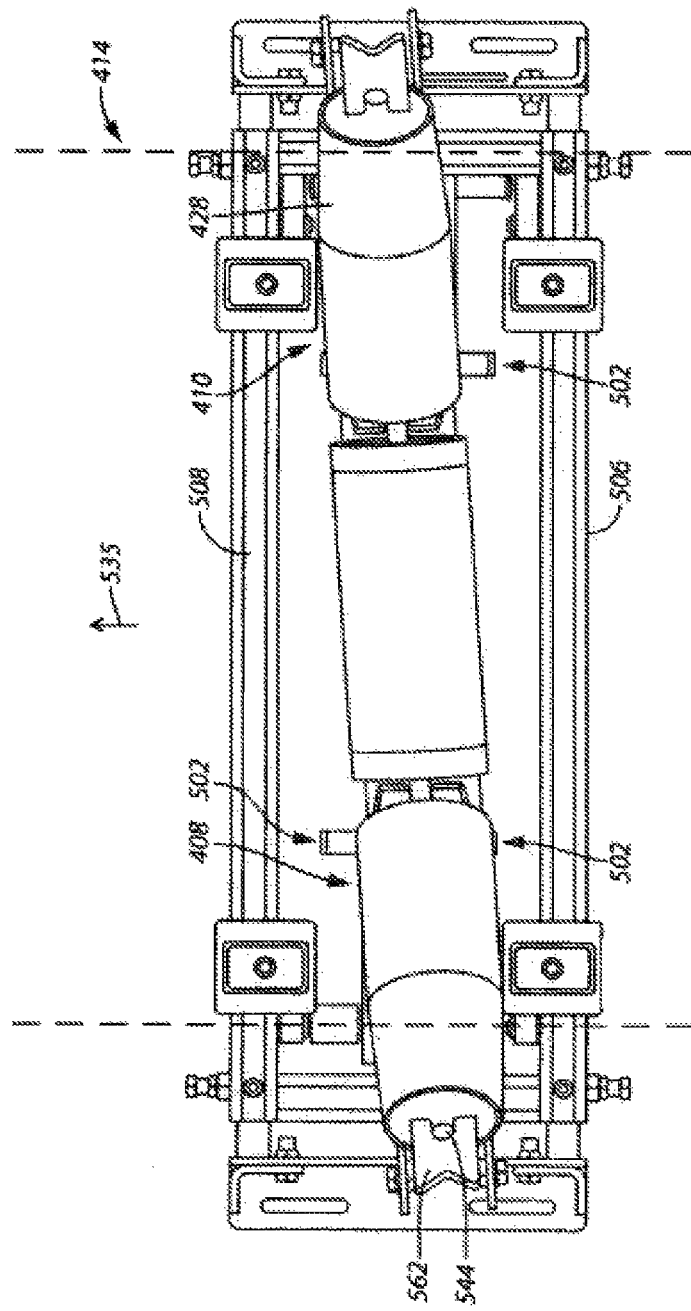
FIG. 25 is a plan view of the belt tracking apparatus of FIG. 14 showing the conveyor belt mistracking toward the right and the right, inclined idler roller shifted further downstream than the left, inclined idler roller.
Figure 26:
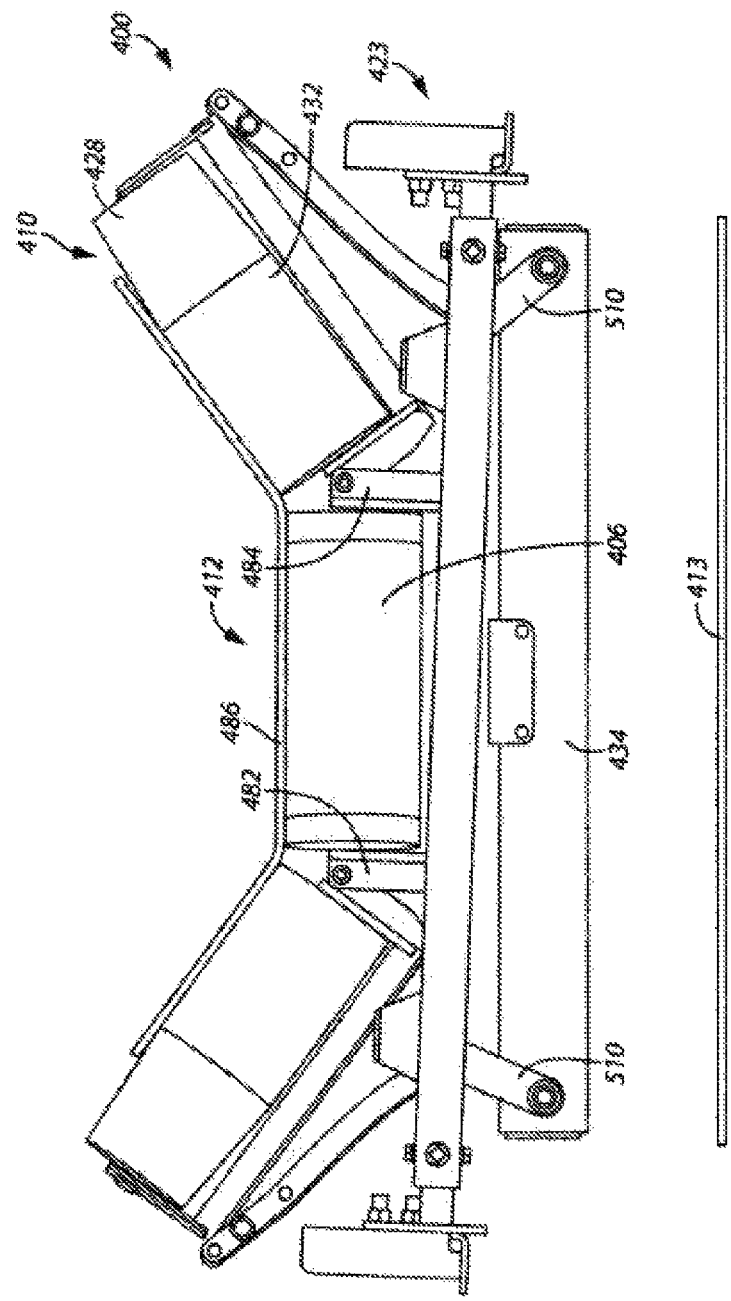
FIG. 26 is a front elevation view of the belt tracking apparatus of FIG. 14 showing the tilting of the tilt frame when the belt has mistracked as in FIG. 25 with the right, inclined idler roller raised relative to the left, inclined idler roller.

The belt tracking apparatus 400 operates similarly to the belt tracking apparatus 10 in that a reaction force from the belt 414 against the idler rollers 404 that have been shifted for steering the mistracking belt 414, such as shown in FIG. 25, back towards its correct, centered travel path on the idler rollers 404 is used as an energizing or actuation force for generating a tilting action of the idler rollers 404, such as shown in FIG. 26.

The belt tracking apparatus 400 has an idler roller device 416 including an idler roller frame 414 rotatably mounted to a tilt device 420, and more specifically tilt frame 422 thereof. The idler roller frame 414 and tilt frame 422 are supported by support base frame 423 that is configured to be secured to the conveyor structure. In the belt tracking apparatus 400, the frame assembly 402 includes the idler roller frame 414, the tilt frame 422 and the base frame 423.

Figure 17:
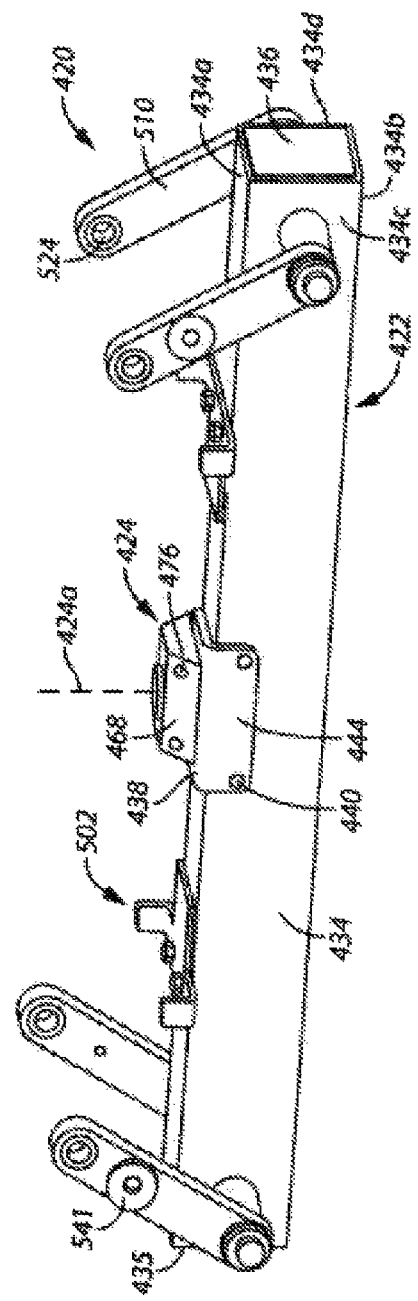
FIG. 17 is a perspective view of a tilt device including the tilt frame of the frame assembly showing a central pivot assembly for pivotally mounting the idler roller device thereto and linkage members for tilting of the tilt device and the idler roller device.
Figure 18:
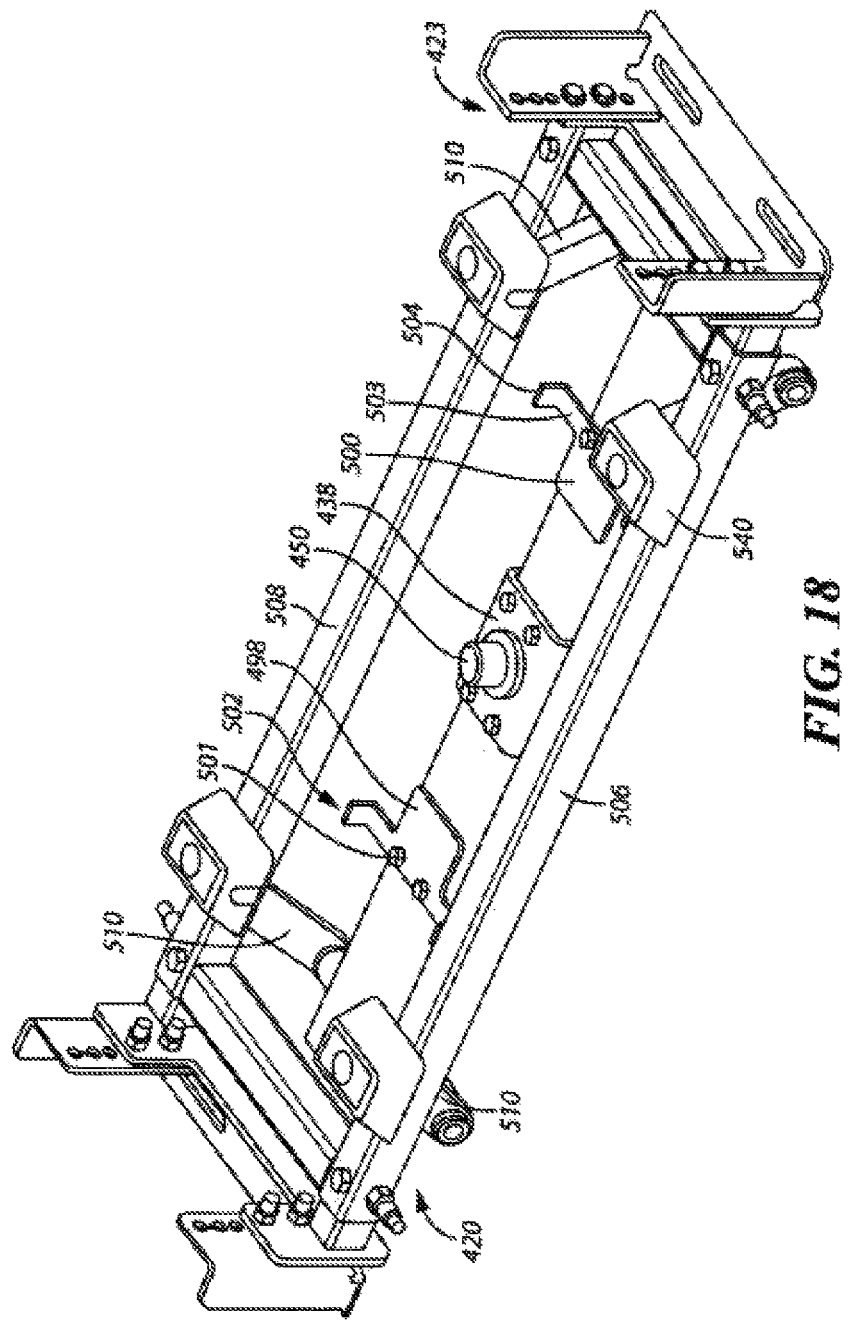
FIG. 18 is a perspective view of the tilt device of FIG. 17 pivotally mounted to a support base frame via the linkage members for tilting relative thereto and showing stops of the tilt device for limiting pivoting of the idler roller device relative thereto.
Figure 19:
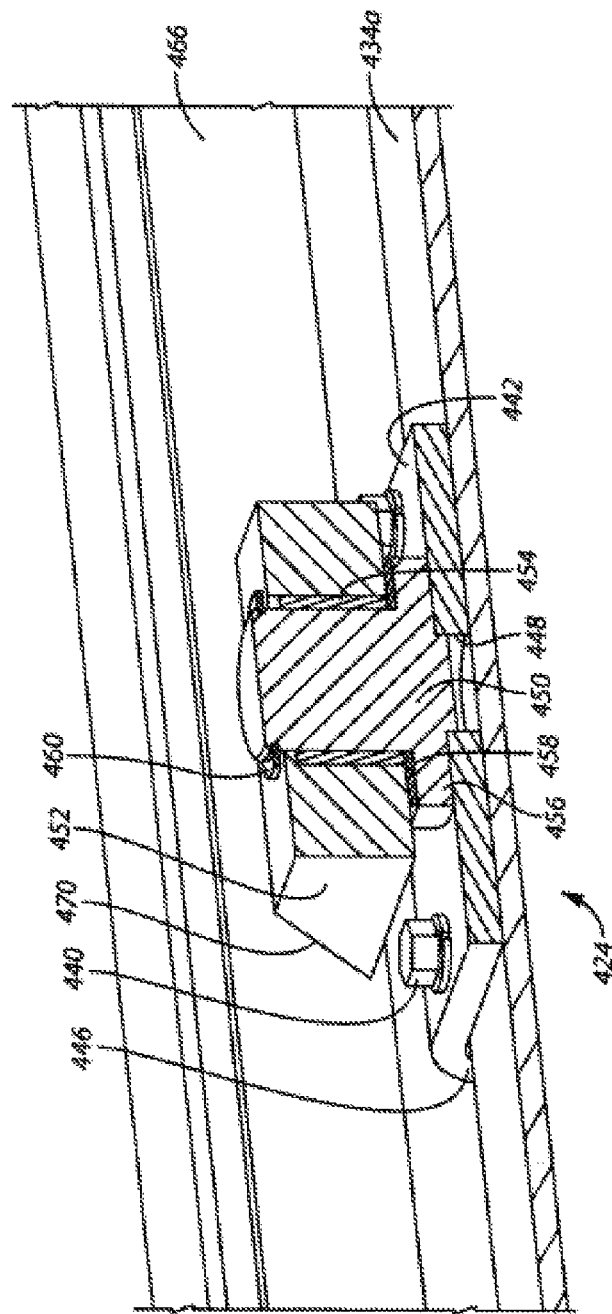
FIG. 19 is an enlarged perspective, sectional view of the center pivot assembly secured to the tilt frame and to a laterally extending base member of the idler roller frame pivotally mounting the idler roller frame to the tilt frame.

The idler roller device 416 and the tilt device 420 have a rotatable connection therebetween in the form of a central pivot assembly 424, as shown in FIGS. 17-19. As can be seen in FIGS. 14, 25 and 26, the inclined, outer idler rollers 408 and 410 have their respective outer end portions 426 and 428 tapered. The rollers 408 and 410 taper from respective cylindrical portions 430 and 432 down to their reduced diameter outer end via the tapered end portions 426 and 428 thereof. By way of example and not limitation, the taper can be at approximately four degrees 4°.

As previously described with respect to rollers 18 having tapered end portions 22, when the belt 414 mistracks toward one or the other of the outer idler rollers 408 or 410, the increased engagement of the belt 414 with the tapered end portion 426 or 428 will cause that roller to be pulled downstream because of the increased drag force due to the reduced linear speed of the tapered end portions 426 and 428 relative to the larger diameter cylindrical portions 430 and 432 of the respective idler rollers 408 and 410. In this regard, the idler roller device 416 will be shifted relative to the tilt device 420 as by being rotated, and more specifically pivoted, via the central pivot assembly 424 therebetween. At a taper of 4°, it has been found that the rollers 408 and 410 will generate sufficient frictional drag forces for shifting of the idler roller device 416 while not causing the belt 414 to simply slip thereover.

Alternatively, sensor rollers that engage the side edges of the conveyor belt could be used to generate the energizing force for shifting the idler rollers 404 as described above. However, this would not readily allow the belt tracking apparatus 400 to be used with conveyor belts 414 that can travel in opposite directions without having to disassemble the apparatus 400 from the conveyor structure and reorient the apparatus 400 for being operable to correct the belt 414 when it mistracks and is traveling in the opposite direction. Accordingly, for reversing conveyor belt applications, the belt tracking apparatus 400 having an idler roller or rollers 404 with tapered outer end portions 426 and 428 is preferred.

This shifting of the idler rollers 404 is depicted in FIG. 25 where the belt 414 has mistracked toward the outer roller 410. In this instance, the outer roller 410 has been shifted so that it is further downstream than the center roller 406 and the opposite outer roller 408. As mentioned, this shifting occurs by pivoting of the idler roller frame 418 about the central pivot assembly 424, and specifically about pivot axis 424a thereof (FIG. 17). As can be seen in FIG. 25, since the idler rollers 404 maintain their orientation relative to one another as mounted to the idler roller frame 414, the tapered end portion 428 of the idler roller 410 is shifted further downstream than the cylindrical portion 432 of the idler roller 410, as well as being further downstream than the center roller 406 and the outer roller 408.

The tilt frame 422 includes a main, laterally extending frame member 434. The main tilt frame member 434 can be extruded to have a substantially square cross-sectional shape so that it includes an upper wall 434a, a lower wall 434b and opposite side walls 434c and 434d interconnecting the upper and lower walls 434a and 434b, as can be seen in FIG. 17. The ends of the main frame member 434 are closed by end wall caps 435 and 436 welded thereto to seal the interior of the main frame member 434 from fouling such as due to debris from the conveyor belt 414.

The central pivot assembly 424 includes an inverted generally U-shaped mounting bracket 438 that is secured centrally along the length of the main frame member 434 as by fasteners 440. The mounting bracket 438 has an upper plate portion 442 from which opposite leg portions 444 and 446 depend. As shown, the mounting bracket 438 is sized so that the upper plate portion 442 is fastened to the upper wall 434a of the main frame member 434 by a pair of fasteners 440 with the leg portions 444 and 446 extending down along either side wall 434c and 434d with each being secured to the corresponding side walls 434c and 434d by a pair of fasteners 440.

Referring specifically to FIG. 19, the upper plate portion 442 of the mounting bracket 438 has a central aperture 448 into which the bottom of a flanged axle stud 450 is seated. The stud 450 is secured to the plate portion 442 as by welding and acts as the pivot shaft for the central pivot assembly 424. A wedge-shaped pivot block 452 is rotatably mounted to the stud 450 by a bearing in the form of bushing 454 that extends along and about the stud 450. Further, the stud 450 includes a lower, radially extending flange portion 456 that is seated on the plate portion 442 of the mounting bracket 438. A bearing for taking axial loads in the form of a thrust washer 458 is disposed between the flange portion 456 and the bottom of the pivot block 452. The pivot block 452 is retained on the stud 450 by a retaining clip 460 at the upper end of the stud 450.

Figure 16:
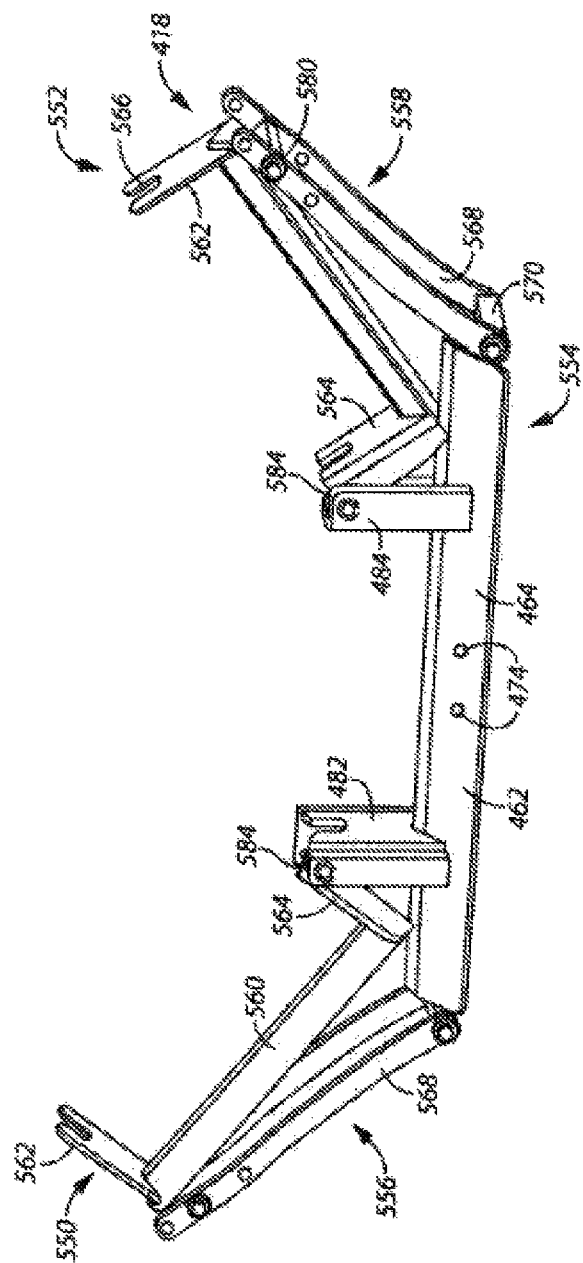
FIG. 16 is a perspective view of the idler roller frame of an idler roller device configured for supporting the idler rollers in the troughed configuration.
Figure 21:
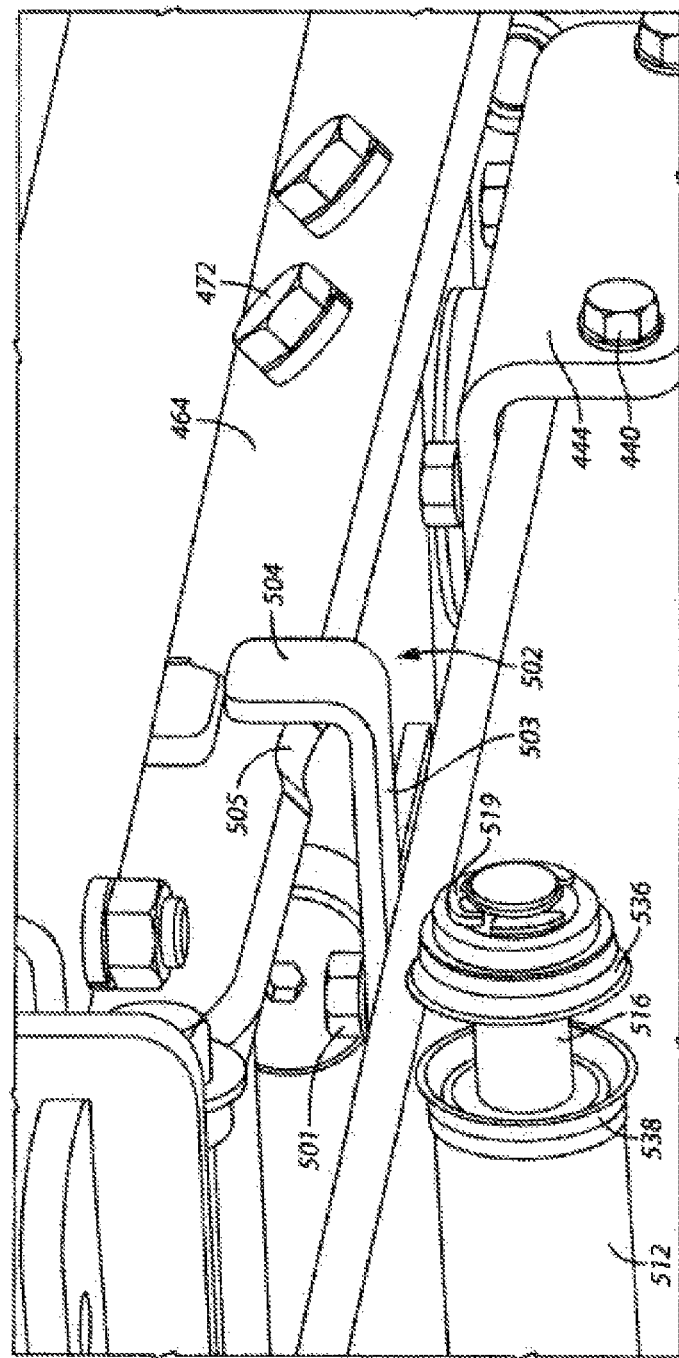
FIG. 21 is an enlarged perspective, fragmentary view showing the rollers of the idler roller frame engaged on a rolling surface of the tilt frame.
Figure 24:
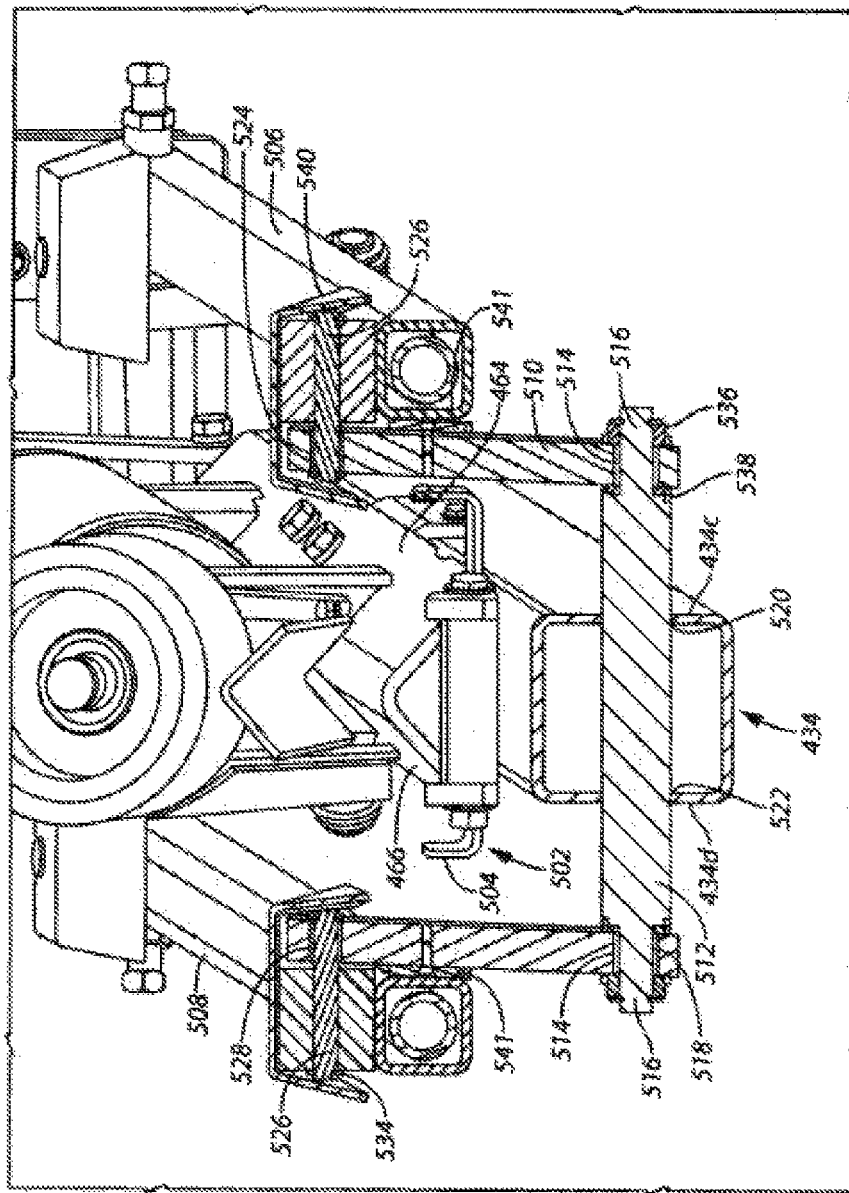
FIG. 24 is an end perspective, sectional view of the belt tracking apparatus showing pivot shafts extending between upper ends of the linkage members and the mounting lugs for pivotally connecting the linkage members to the support base frame.

The idler roller frame 418 includes a laterally extending base member 462, as shown in FIG. 16. The base member 462 can be extruded to have an inverted V cross-sectional configuration with a pair of inclined wall portions 464 and 466, as best seen in FIG. 24. The inclination of the wall portions 464 and 466 substantially matches that of opposite inclined surfaces 468 and 470 of the wedge-shaped pivot block 452 for being secured thereto. Referring to FIGS. 19 and 21, fasteners 472 are received in aligned apertures 474 and 476 (FIGS. 16 and 17) of the base member 462 and the pivot block 452, respectively, for securing the pivot block 452 and base member 462 together. In this manner, the idler roller device 416 is pivotally mounted to and carried on the tilt device 420 for pivoting about pivot axis 424a. In addition, the inverted V cross-sectional configuration of the base member 462 provides the advantage of substantially covering the underlying tilt frame member 434 to keep debris from the conveyor belt operations from accumulating thereon and does not present a horizontal surface for the accumulation and build-up of such debris on the base member 462 itself.

As can be seen in FIG. 17, the pivot axis 424a generally extends normal to the main frame member 434, and specifically to the upper wall 434a thereof. Typically, the pivot axis 424a will extend normal to the conveyor belt 414 when the conveyor belt tracking apparatus 400 is mounted to the conveyor structure so that the apparatus 400 can be used in a bi-directional manner with respect to the travel directions of the conveyor belt 414, as will be described further hereinafter.

Figure 20:
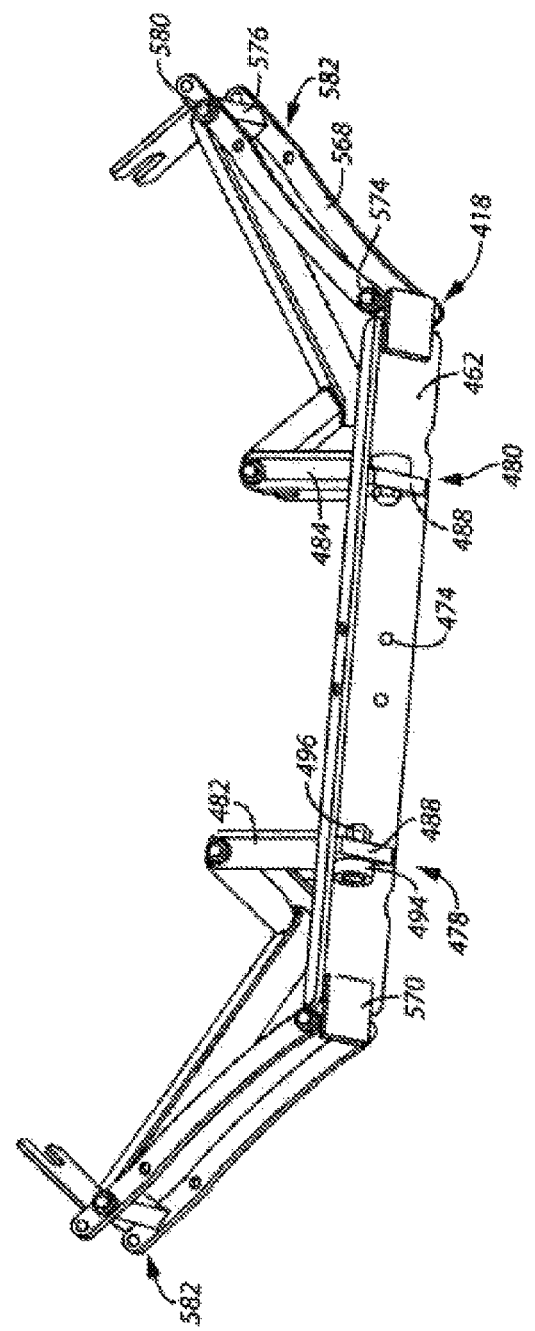
FIG. 20 is a perspective view of the idler roller frame showing rollers rotatably mounted at the bottom of the base member thereof.

For additional load bearing support for the idler roller device 416 over that provided by the central pivot assembly 424, base member 462 has roller assemblies 478 and 480 secured to the underside thereof, as can be seen in FIG. 20. As shown, the roller assemblies 478 and 480 are spaced on either side of the central location at which the central pivot assembly 424 is secured to the base member 462. Preferably, the roller assemblies 478 and 480 are disposed directly under upstanding mounting brackets 482 and 484 configured for supporting the center idler roller 406 extending therebetween. The center idler roller 406 supports the lower portion 486 of the troughed conveyor belt 412, as shown in FIG. 26. It has been found that the lowered belt portion 486 and the center idler roller 406 thereunder can generally support approximately 70% of the loading generated by the material carried on the upper run 412 of the conveyor belt 414. Thus, by positioning the roller assemblies 478 and 480 under the brackets 482 and 484 supporting the center idler roller 406 and the lowered belt portion 486 thereon, the majority of the load carried by the conveyor belt 414 can be transferred directly to the tilt frame main member 434, as described further below.

More specifically, the roller assemblies 478 and 480 each include a mounting plate 488 that is configured to be secured to the underside of the base member 462. The mounting plates 488 can have a generally triangular configuration for being secured to the inclined wall portions 464 and 466 as by welding thereto. Referencing FIGS. 20 and 27, the mounting plates 488 have a through aperture 490 for receiving a shaft 492 of a roller 494 extending therethrough. The shaft 492 is rotatably received in the through aperture 490 and can have a threaded end for receiving a nut 496 thereon to rotatably secure the roller 494 to the associated mounting plate 488.

Figure 27:
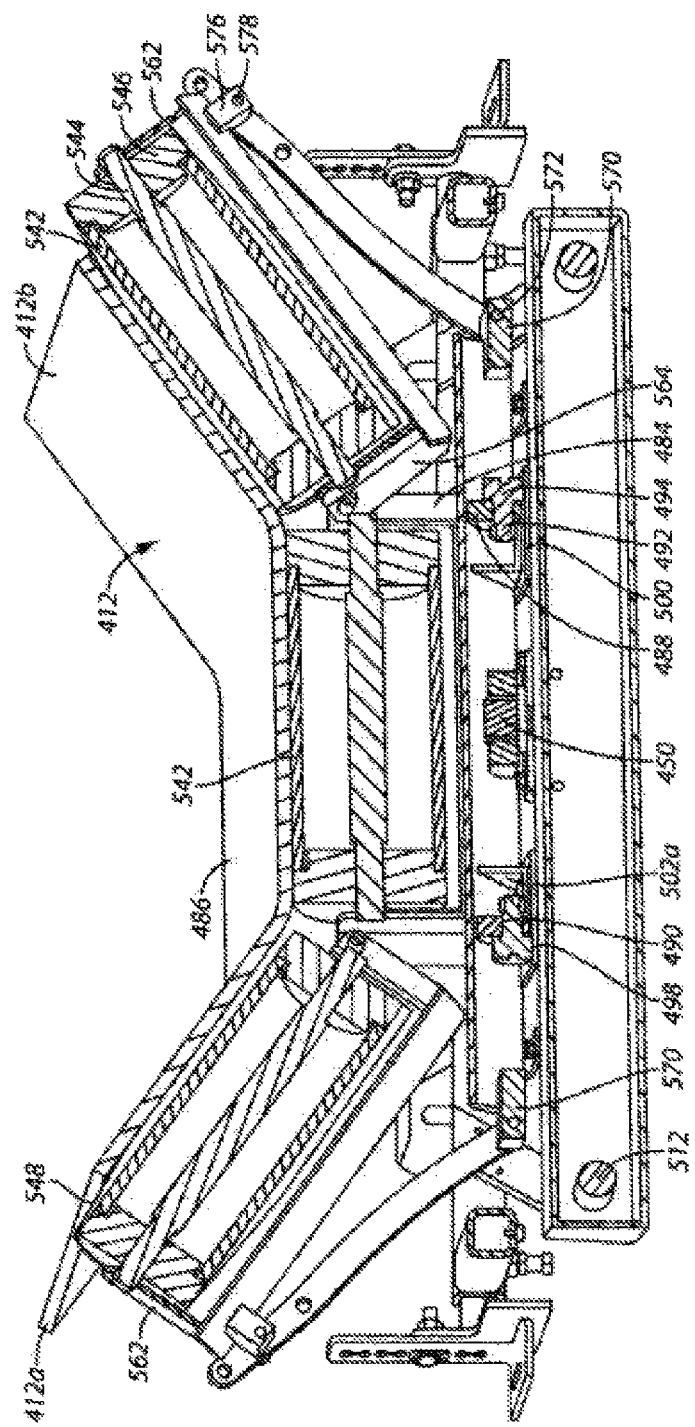
FIG. 27 is a cross-sectional view of the belt tracking apparatus of FIG. 14 showing the shafts for the tapered, outer inclined idler rollers and the opposite stub shaft portions for the center idler roller.

A pair of engagement plates 498 and 500 are secured to the upper wall 434a of the tilt frame member 434 with fasteners 501. The engagement plates 498 and 500 are on either side of the central pivot assembly 424 positioned to be aligned with the corresponding overlying rollers 494 of the roller assemblies 478 and 480, as best seen in FIGS. 21 and 27. The engagement plates 498 and 500 provide a smooth, flat surface across the upper wall 434a of the main frame member 434 so that as the idler roller frame 418 pivots relative to the tilt frame 422, the rollers 494 roll along the smooth, flat surface of the engagement plates 498 and 500 to provide low friction support for the pivotal idler roller device 416 having the idler rollers 404 supporting the load of the conveyor belt 414 thereon. Thus, the rollers 494 are operable to transfer load directly to the tilt frame 422 and the main frame member 434 thereof while keeping rotational friction due to their engagement with the smooth, flat engagement plates 498 and 500 to a minimum. In this regard, the rollers 494 can have a crowned configuration to reduce the contact area between the rollers 494 and the associated engagement plates 498 and 500 for further friction reduction.

The pivoting of the idler roller 416 is limited by stops 502 between the idler roller frame 418 of the idler roller device 416 and the tilt device 420, and specifically the main frame member 434 thereof. It has been determined that there is a point at which shifting of the rollers 404 in response to conveyor belt mistracking loses effectiveness in terms of the steering action the shifted rollers 404 provide as a corrective influence on the travel path of the belt 414. In this regard, the stops 502 are positioned to limit the pivoting of the idler roller device 416 relative to the tilt device 420, as can be seen best in FIGS. 17 and 18.

The stops 502 can be integral with the engagement plates 498 and 500 in the form of extension arm portions 503 that have upwardly bent end tab portions 504. The arm portions 503 extend out beyond the width of the tilt frame member 434 in a longitudinal, fore-and-aft direction generally transverse, and more specifically orthogonal, to the length of the belt tracking apparatus 400 as it extends across the conveyor belt 414. In this manner, there are upstream and downstream stop tab portions 504 that are in position to engage the wall portions 464 and 466 of the idler roller frame base member 462, as shown in FIGS. 21 and 24. The stops 502 are adapted to limit the pivoting of the idler roller frame 418 to a predetermined angular amount so that over rotation of the idler roller device 416 is avoided. A stop 502a having an alternative confirmation is shown in FIG. 27 and will be described in detail hereinafter. By way of example and not limitation, the stops 502 or 502a can limit the pivoting of the idler roller frame 418 to approximately four degrees (4°) in either direction from the non-pivoted, neutral position shown in FIG. 14 where the idler roller frame 418 generally extends in alignment with the tilt frame 422. The bottom edges of the base member wall portions 464 and 466 can have notches 505 to provide the wall portions 464 and 466 with clearance so that the fasteners 501 do not create interference with the pivoting of the base member 462.

The tilt device 420 is shown best in FIGS. 17 and 18. The tilt device 420 is mounted to the support base frame 423 such that after the idler roller device 416 has been pivoted relative to the tilt device 420 and a reaction force has been applied to the idler rollers 404 by the mistracking conveyor belt 414, the tilt device 420 is operable to tilt such that the downstream idler roller 410 (FIG. 25) is raised as shown in FIG. 26 relative to its position prior to being tilted such as in the neutral configuration of the belt tracking apparatus 400. Thus, in addition to providing a steering action with the pivoted idler rollers 404 as shown in FIG. 25, the tilted rollers 404 will urge the mistracking conveyor belt 414 back towards its correct travel path to be centered on the idler rollers 404.

For this purpose, the tilt frame 422 has the main frame member 434 thereof hung from the support base frame 423, and specifically from a pair of laterally extending support members 506 and 508 thereof via a linkage system, as shown in FIG. 18. The linkage system includes linkage members or bars 510 pivotally connected to the tilt frame member 434 at their lower ends and to the support members 506 and 508 at their upper ends, as shown in FIGS. 17 and 24.

There are a pair of linkage bars 510 at either end of the tilt frame member 434. The linkage bars 510 in a pair are interconnected at their lower ends by a single, lower axle member 512. The linkage bars 510 have lower through apertures 514, and the lower axle member 512 is provided with reduced opposite ends 516 that extend through the apertures 514 and are rotatably mounted therein by bushings 518, as can be seen in FIG. 24. The projecting portions of the axle reduced ends have retaining clips 519 (FIG. 21) thereon to keep the lower axle 512 members properly assembled to the linkage bars 510 at their lower ends. Each of the axle members 512 extend in clearance through corresponding sets of laterally aligned openings 520 and 522 formed in respective side walls 534c and 534d adjacent the opposite ends of the tilt frame member 434.

Figure 22:
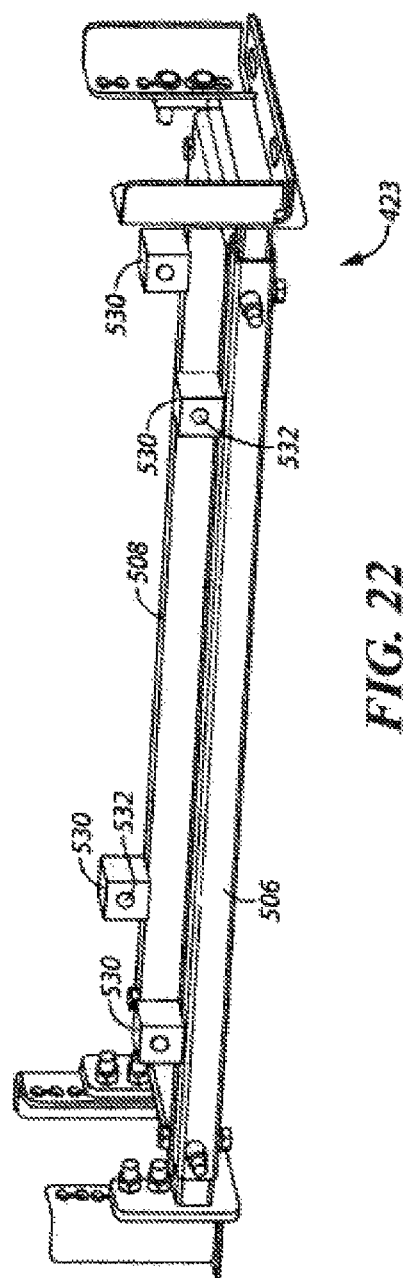
FIG. 22 is a perspective view of the support base frame of the frame assembly showing a pair of spaced laterally extending support members having mounting lugs secured thereto to which upper ends of the linkage members are pivotally connected.

The linkage bars 510 each also include an upper through aperture 524 that each receive an upper axle member 526 extending therethrough and are rotatably mounted to the linkage bar 510 via bushing 528 in the aperture 524. Referencing FIG. 22, the support members 506 and 508 each have a pair of mounting lugs 530 that are mounted adjacent opposite ends thereof and aligned with a corresponding one of the pair of lugs 530 on the opposite one of the support members 506 or 508. The mounting lugs 530 are fixed to the support members 506 and 508 as by welding and each include a through opening 532 having a corresponding one of the axle members 526 extending therethrough. At the projecting ends of the upper axle members 526 opposite to the ends extending through the linkage bars 510 and which projects beyond the mounting lugs 530, retaining clips 534 are mounted for keeping the axle members 526 properly assembled to the mounting lugs 530, as shown in FIG. 24.

Figure 15:
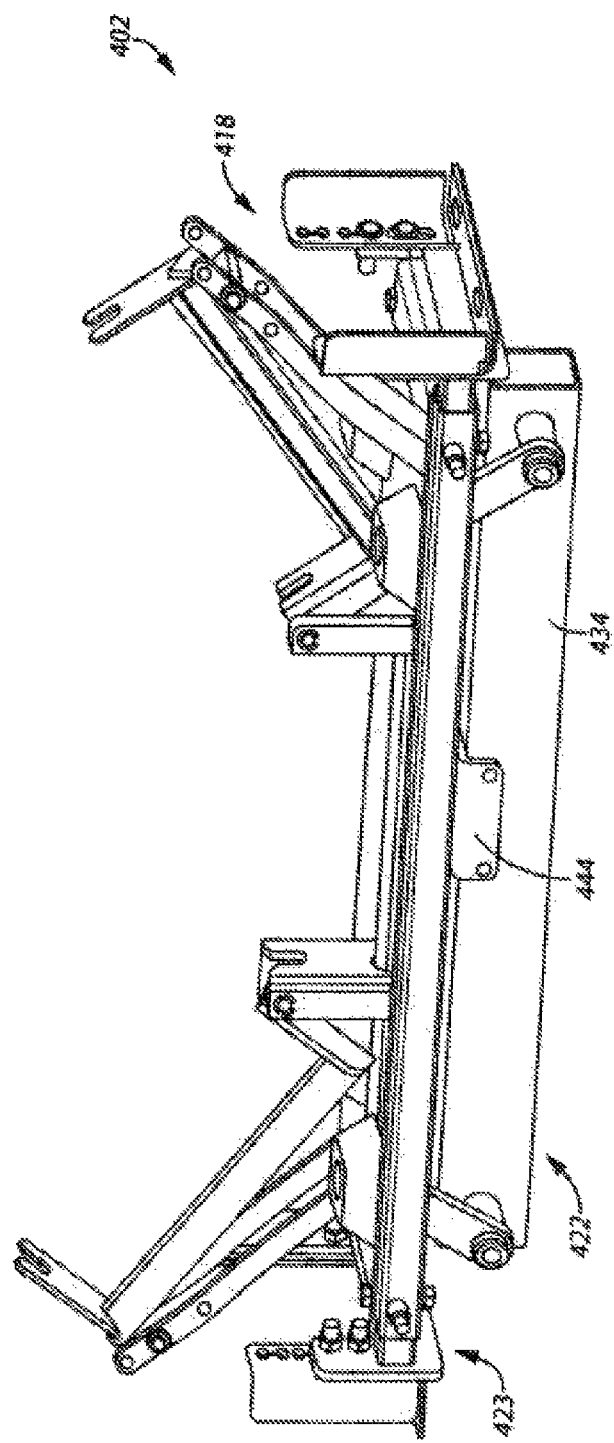
FIG. 15 is perspective view of the frame assembly of the belt tracking apparatus of FIG. 14 with the idler rollers removed showing a support base frame, idler roller frame and a tilt frame of the frame assembly.

The mounting lugs 530 are fixed to the support members 506 and 508 of the support base frame 423 to be laterally inward of the corresponding aligned openings 520 and 522 adjacent the ends of the underlying tilt frame member 434. In this manner, when the linkage bars 510 are pivotally connected to the tilt frame member 434 and the support members 506 and 508 via the axle members 512 and 526, the linkage bars 510 extend obliquely, upward and laterally inward between the lower tilt frame member 434 and the upper support members 506 and 508, as shown in FIGS. 14 and 15. Thus, when a reaction force from the steered conveyor belt 414 is applied to the idler rollers 404, the lateral component of this reaction force will cause the tilt frame 422, and specifically the tilt frame member 434 thereof, to swing on the linkage bars 510. This swinging action generates both a lifting and lowering movement of opposite ends of the tilt frame member 434 but also lateral shifting thereof toward the raised end, as can be seen in FIG. 26. To optimize the lift against the amount of lateral shifting of the tilt frame member 434 and thus the idler rollers 404 carried thereby, it has been found that when the apparatus 400 is in its neutral configuration, an angle of 120° between the linkage bars 510 and the support members 506 and 510 can be utilized, as depicted in FIGS. 14 and 15.

Referring to FIG. 25, with the belt traveling in the downstream travel direction 536 and mistracking to the right toward the outer idler roller 410, the idler rollers 404 are pivoted so that the end portion 428 of the idler roller 410 is shifted downstream further than the cylindrical portion 432 of the idler roller 410 and further downstream than the center roller 406 and the other idler roller 408. This provides the belt 414 with a steering action back towards the left and generates a reaction force in the belt 414 that has lateral force component back toward the right which, in turn, causes tilting of the tilt frame 422 via the linkage bars 510. Referencing FIG. 26, it can be seen that the left pair of linkage bars 510 will swing the left end portion of the tilt frame member 434 downward while the right pair of linkage bars 510 will swing the right end portion of the tilt frame member 434 upwardly thereby lowering the left outer idler roller 408 and raising the right outer idler roller 410 from their positions in the non-tilted or neutral configuration of the belt tracking apparatus 400. Thus, the tilting action generated by the belt tracking apparatus 400 is a result of and subsequent to the rotation or pivoting action of the rollers 404 for steering the belt 414 back towards its correct travel path.

To avoid fouling of the pivot locations for the axle members 512 and 526, the axle member 512 has seal rings 536 and 538 mounted thereto on either side of the reduced end 516 thereof extending through the lower aperture 514 in the linkage bar 510, as can be seen in FIG. 21 which has the linkage bar 510 removed and in FIG. 24. The upper axle members 526 each have a cover member 540 secured to the corresponding mounting lug 530 and configured to extend over the mounting lug 530 and the upper end portion of the associated linkage bar 510 to cover the upper axle member 526 that pivotally connects the linkage bar 510 to the mounting lug 530, as shown in FIG. 24.

For utilizing the conveyor belt tracking apparatus 400 with the upper run 412 of a conveyor belt 414 have a troughed configuration, the apparatus 400 has to be sized to fit into the relatively compact vertical space formed between the upper carry run 412 of the belt 414 and the lower return run 413 thereof, as depicted in FIG. 26. To this end, the belt tracker apparatus 400 has the main frame member 434 of the tilt frame 422 hung from the support base frame 423, rather than supported in an elevated position relative thereto as with the previously described tracking apparatus 10 that is more suitable for use with the return run of the belt 12. The belt tracking apparatus 400 is configured so that the tilt frame 422, and particularly the main frame member 434 thereof, is mounted to the support base frame 423, and specifically the laterally extending support members 506 and 508 thereof, to generally be below the support members 506 and 508 of the support base frame 423 when the apparatus 400 is in its non-tilted or neutral configuration, as shown in FIGS. 14 and 15. On the other hand, the idler roller frame 418 is pivotally mounted to the tilt frame member 434 so that it primarily extends above the support members 506 and 508 of the support base frame 423. In this manner, the belt tracking apparatus 400 having the idler roller frame 418 pivotally carried on the tilt frame 422 does not also stack the tilt frame 422 on the support base frame 423, and instead hangs the tilt frame 422 therefrom so that the support members 506 and 508 extend generally intermediate the idler roller frame 418 and the tilt frame 522 in the vertical direction.

Figure 23:
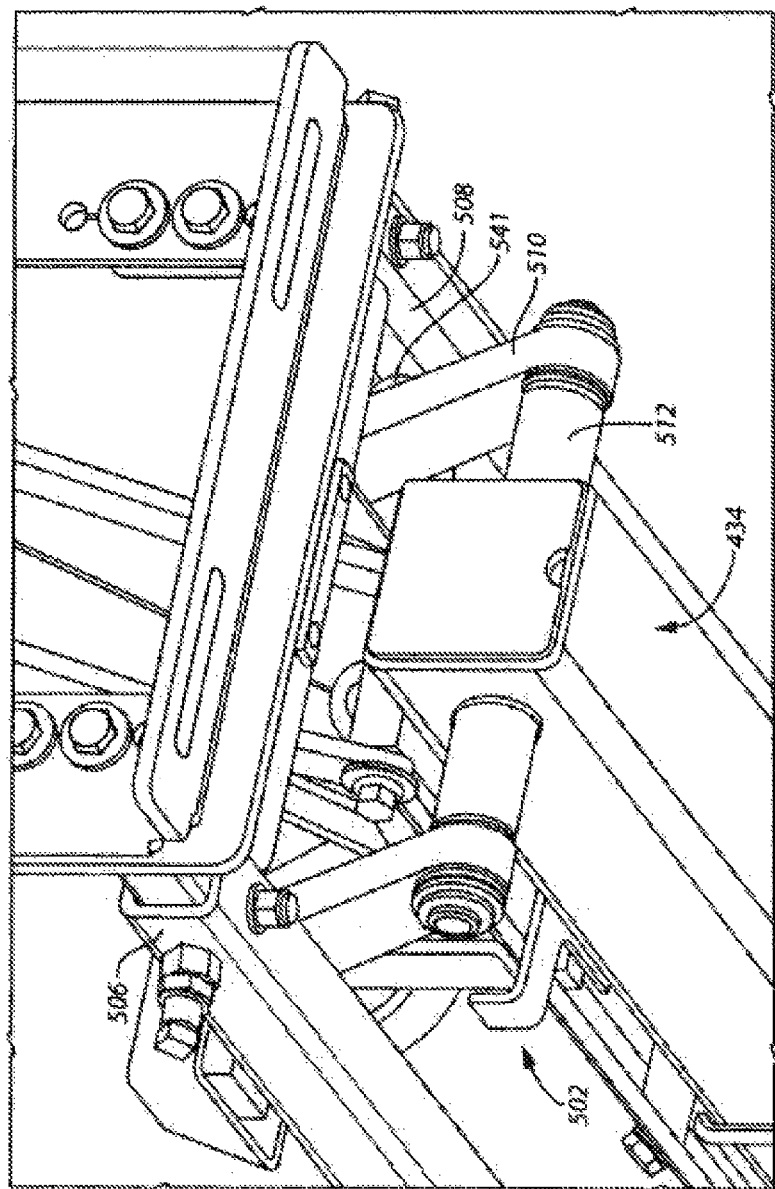
FIG. 23 is an enlarged end perspective view of the frame assembly showing a single pivot shaft extending through an end of the tilt frame and having the lower ends of a pair of the linkage members pivotally secured at either end thereof for pivotally connecting the linkage members to the tilt device.

In addition, the laterally extending support members 506 and 508 are spaced from each other in the fore-and-aft direction so that the idler roller frame 418 and the tilt frame 422 fit therebetween while allowing sufficient room for pivoting of the idler roller frame 418 through its full angular range of motion and for tilting of the tilt frame 422 without interference from the support members 506 and 508. The linkage bars 510 can each have a bearing plate 541 (FIG. 17) of low friction material secured thereto to be in facing and engaging relation with the adjacent one of the support members 506 and 508, as shown in FIGS. 23 and 24. Because there will be a force acting on the apparatus 400 during belt operations in the downstream direction 536, the bearing plates 541 take up space between the linkage bars 510 and the support members 506 and 508 to avoid play therebetween that could generate wear and damage to the apparatus 400. Thus, the bearing plates 541 act to provide a durable wear surface and a load bearing member between the linkage bars 510 and the support members 506 and 508. It should be noted that all of the linkage bars 510 are provided with bearing plates 541 since depending on the direction in which the belt upper run 412 is traveling, either the bearing plates 541 engaging the support member 506 or the bearing plates 541 engaging the support member 508 will be required to take the loading due to downstream travel forces generated by the belt 414.

Referencing FIG. 27, the interiors of the idler rollers 404 are shown. Each idler roller 404 of the idler roller device 416 includes an outer shell 542 that is supported for rotation about a shaft 544 via roller bearing assemblies 546 at corresponding ends of the shell 542 and shaft 544. As previously described, the outer idler rollers 408 and 410 are constructed in a manner similar to the rollers 18 of the belt tracking apparatus 10 in that they include tapered end portions 426 and 428.

The outer shell 542 can generally be of nylon material. However, it has been found particularly in lower temperature environments that the nylon material may not provide the desired level of friction for the tapered idler rollers 408 and 410 with the conveyor belt 414. In this regard, the outer idler rollers 408 and 410 are provided with a urethane sleeve 548 that extends about the shell 542. With the shell 542 coated with the urethane material of the sleeve 548, a more resilient interface is provided between the idler rollers 408 and 410 and the conveyor belt 414, which is of particular significance along the respective outer tapered portions 426 and 428 thereof where the frictional engagement with the belt 414 is used to create the drag forces for shifting of the idler roller device 416 when the belt 414 is mistracking. The resilient interface with the belt 414 provided by the urethane material provides a better frictional grip therebetween so that the belt 414 traveling at the fastener linear speed at which the cylindrical portions 430 and 432 of the idler rollers 408 and 410 also travel will not simple slip past the tapered portions 426 and 428, but instead will frictionally engage and pull either the tapered end portion 426 or 428 further downstream when the belt is mistracking toward the respective idler roller 408 or 410.

Because the conveyor belt tracking apparatus 400 is configured for use under the upper troughed, carry run 412 of the conveyor belt 414, and the troughing configuration and specifically the angle at which the belt outer side portions 412a and 412b are inclined relative to the lowered central portion 486 can vary from one conveyor system to another, the idler roller frame 418 is made to be adjustable to accommodate different troughing configurations. Referring to FIG. 16, the idler roller frame 418 includes a pair of outer idler roller subframes 550 and 552 for rotatably mounting the respective outer idler rollers 408 and 410 thereto. The laterally extending base member 462 along with the upstanding brackets 482 and 484 form a subframe 556 for rotatably mounting the center idler roller 406 thereto. Together, the subframes 550-556 cooperate to form the idler roller frame 418.

To accommodate the different troughing configurations, the outer idler subframes 552 and 554 are adjustably connected to the center idler subframe 556 via adjustment mechanisms 558 and 560. As shown in FIG. 16, the adjustment mechanism 556 extends between the subframe 550 and the subframe 554 and is operable to adjust the inclination of the subframe 550 relative to the subframe 554. Similarly, the adjustment mechanism 558 extends between the subframe 552 and the subframe 554 and is operable to adjust the inclination of the subframe 552 relative to the subframe 554.

More particularly, the subframes 550 and 552 are each constructed identically with each including an elongate base frame member 560 having upstanding brackets 562 and 564 at either end thereof. Like the brackets 482 and 484, all of the brackets including brackets 562 and 564 have upwardly opening slots 566 to allow the idler rollers 404 to be lowered into operative position therein with the projecting ends of the shafts 544 of the idler rollers 404 seated at the bottom of the slots 566, as shown in FIG. 27.

The adjustment mechanisms 556 and 558 likewise are identically constructed each including a pair of tie bars 568 that are pivotally connected to the base member 462 at either end thereof and to the corresponding end of the subframe 550 or 552 extending beyond the base member 464, as shown in FIGS. 16 and 20. For this purpose, a pivot mounting block 570 is fixed at either end of the base member 462 to project outwardly therefrom. The pivot mounting block 570 fits between the lower ends of the tie bars 568 and has a through bore opening 572 through which lower pivot shaft 574 extends. The projecting ends of the pivot shaft 574 project through corresponding apertures (not shown) at the lower ends of the tie bars 568 for pivotally connecting the tie bars 568 to the base member 462. Similarly, the base members 560 each have a pivot mounting block 576 fixed thereto at their distal ends sized to fit between the corresponding tie bars 568 and which include a through bore 578 through which pivot shaft 580 extends. Each pair of tie bars 568 is provided with three sets of aligned apertures, generally designated 582. The sets of apertures 582 can include an upper set of apertures 528a, an intermediate set of apertures 582b, and a lower set of apertures 582c. The trough configuration of the idler rollers 404, and specifically the angle of inclination of the outer idler rollers 408 and 410 is dictated by which of these sets of apertures 582 are utilized for receiving the projecting ends of the pivot shaft 580 therethrough. Further, to allow the subframes 550 and 552 to be pivotally adjusted, the brackets 564 are pivotally connected with the brackets 482 and 484 of the subframe 554 adjacent their corresponding upper end via pivot shafts 584.

Figure 28:
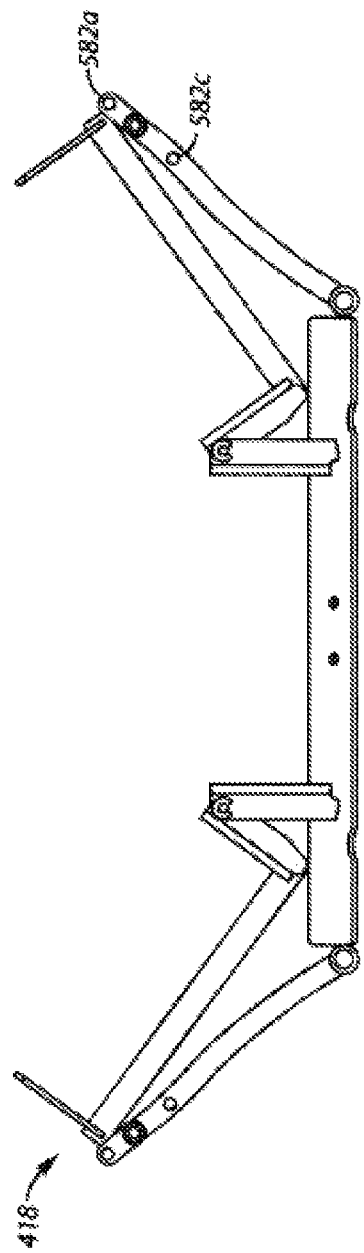
FIG. 28 is a front elevational view of the idler roller frame showing mounting brackets for the outer idler rollers adjustably secured at an intermediate adjusted position for conveyor belts having upper runs with an intermediate troughed configuration.
Figure 29:
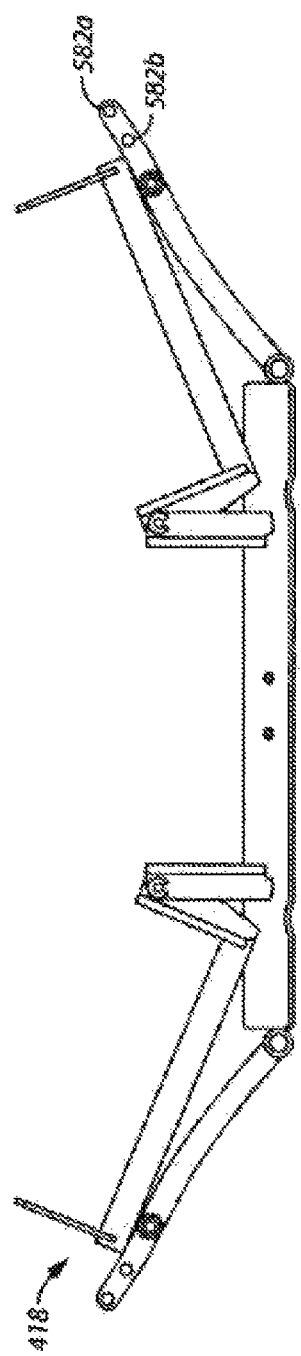
FIG. 29 is a front elevational view of the idler roller frame showing mounting brackets secured at a maximum lowered position for conveyor belts having an upper run having a minimally troughed configuration.
Figure 30:
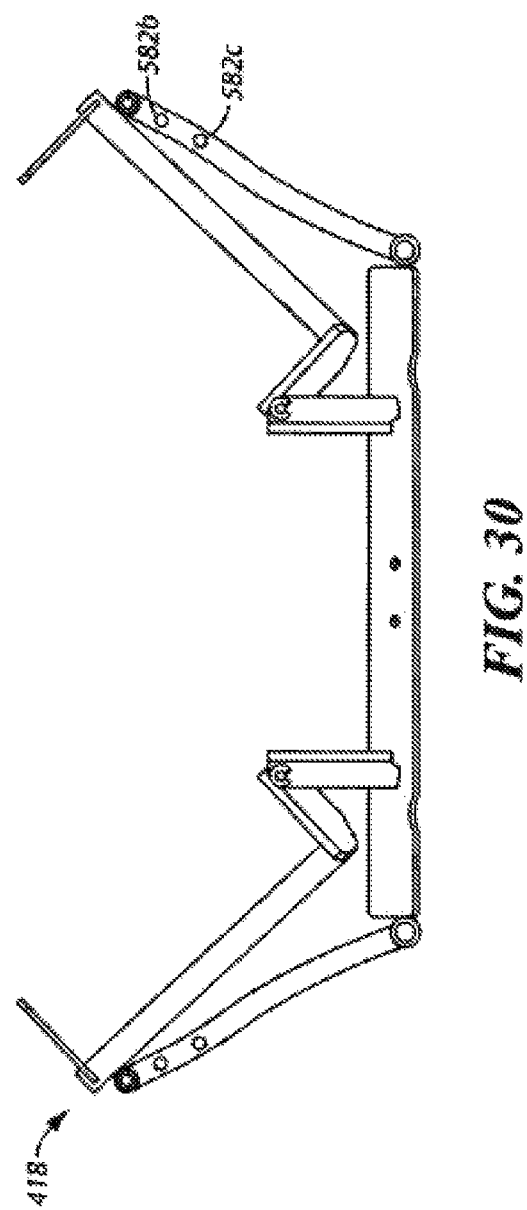
FIG. 30 is a front elevation view of the idler frame showing the mounting brackets secured at a maximum raised position for conveyor belts having upper runs with a maximum troughed configuration.

Referring to FIG. 28, when the upper pivot shaft 580 of the adjustment mechanisms 556 and 558 is received in the intermediate set of apertures 582b, the idler frame 418 is in its intermediate troughed configuration, which could nominally be set at a standard thirty-five degree angle for a conveyor belt 414 having outer side portions 412a and 412b with an intermediate angle troughed configuration. With the lowest aperture set 582c receiving the projecting ends of the upper pivot shaft 580 as shown in FIG. 29, the idler frame 418 is in its minimally troughed configuration, which could nominally be set at a standard twenty degree angle for a conveyor belt 414 having outside portion 412a and 412b with a minimum angle troughed configuration. With the uppermost set of apertures 582a receiving the projecting ends of the upper pivot shaft 580 as shown in FIG. 20, the idler frame 418 is in its maximum troughed configuration, which could nominally be at a standard forty-five degree angle for a conveyor belt 414 having its outer side portions 412a and 412b with a maximum angle trough configuration.

It has also been found that with the belt tracking apparatus 400 having the tapered outer idler rollers 408 and 410, the distal end of the shafts 544 of the idler rollers 408 and 410 supported by the brackets 562 can advantageously be slightly raised relative to the laterally inward proximal ends supported by the bracket members 564. This slight cant of the rollers 408 and 410 from their nominal troughed orientation provides benefits in terms of the engagement of the idler rollers 408 and 410, and particularly their outer tapered end portions 426 and 428 with the troughed upper belt run 412 of the belt 414. In certain instances, the troughed upper belt run 412 can tend to cup at the outer side edges thereof which lifts the edge portions away from engagement with the tapered end portions 426 and 428 of the idler rollers 408 and 410. By raising the distal ends of the shafts 544, e.g. by approximately two inches, and thus the tapered end portions 426 and 428, this will essentially push the end portions 426 and 428 into engagement with the outer edge portions of the belt 414 which will act to flatten them out to overcome any cupping tendency at the belt edge portions.

The slight canting of the idler rollers 408 and 410 can be achieved in any number of ways. For instance, bottoms of the slots 566 of the inner, proximal brackets 564 can be slightly lowered or the bottoms of the slots 566 of the outer distal brackets 562 can be slightly raised. Alternatively, the positioning of each set of the apertures 582 can be slightly shifted to be closer to the distal ends of the tie bars 568.

Figure 31:
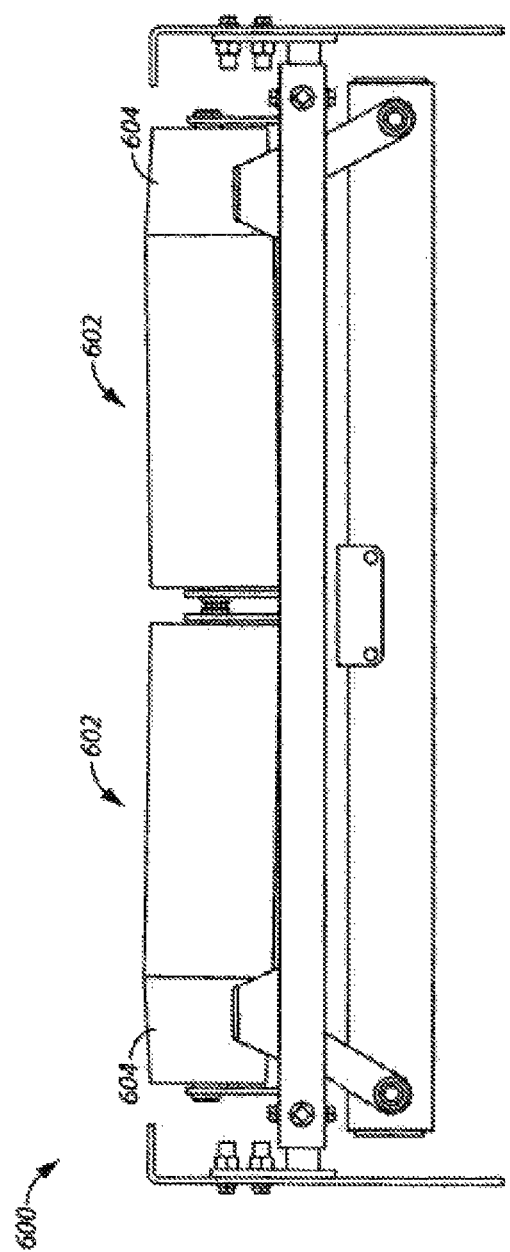
FIG. 31 is a front elevational view of an alternative conveyor belt apparatus tracking for use along the return run of a conveyor belt showing a linear arrangement of the idler rollers but otherwise similar to the conveyor belt tracking apparatus of FIG. 14.

An alternative version of the conveyor belt tracking apparatus 400 is shown in FIG. 31. The alternative conveyor belt tracking apparatus 600 is substantially the same as the belt tracking apparatus 400 (as well as apparatus 10) in terms of its operating principles except it is adapted for use along a flat run of the conveyor belt 414 such as along the flat return run 413 of conveyor belt 414 similar to apparatus 10. Since the structure is substantially the same as the structure for the belt tracker apparatus 400, only the differences will be described in detail hereinafter.

Figure 32:
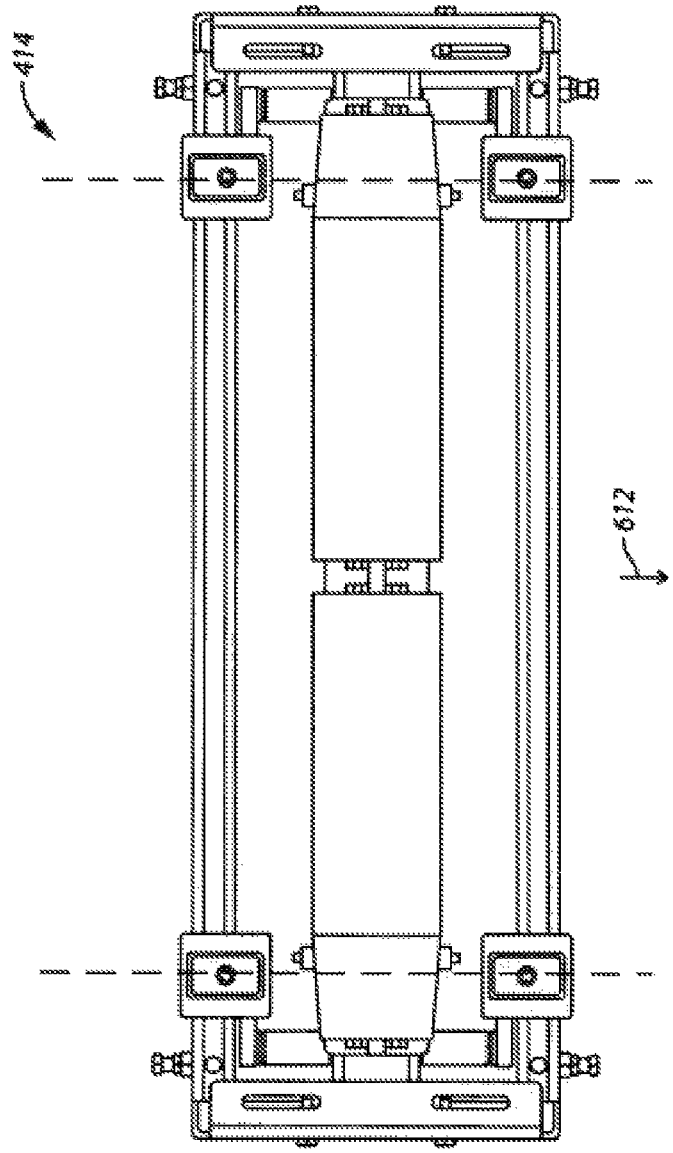
FIG. 32 is a plan view of the belt tracking apparatus of FIG. 31 showing the idler rollers extending orthogonally to the travel path of the centered, conveyor belt thereon.
Figure 33:
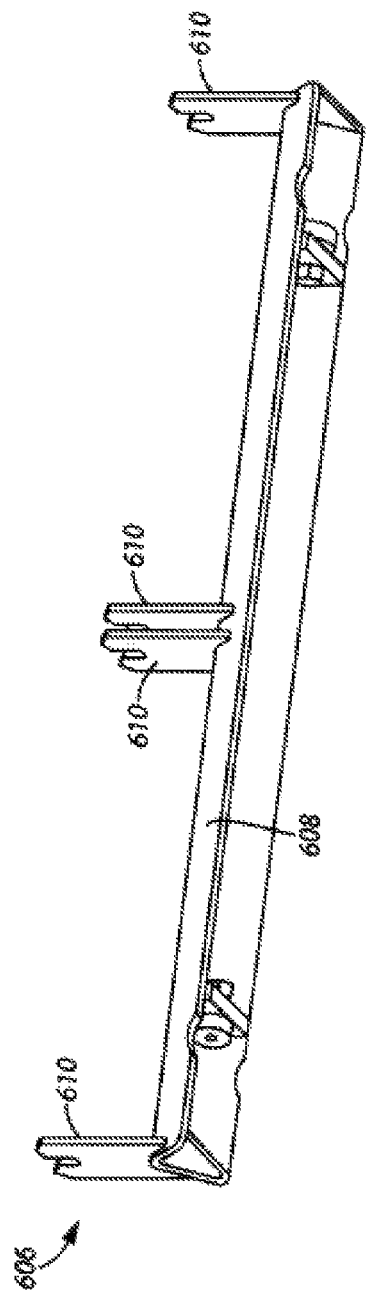
FIG. 33 is a perspective view of the idler roller device with the idler rollers removed showing the idler roller frame of the frame assembly of the belt tracking apparatus of FIG. 31.
Figure 34:
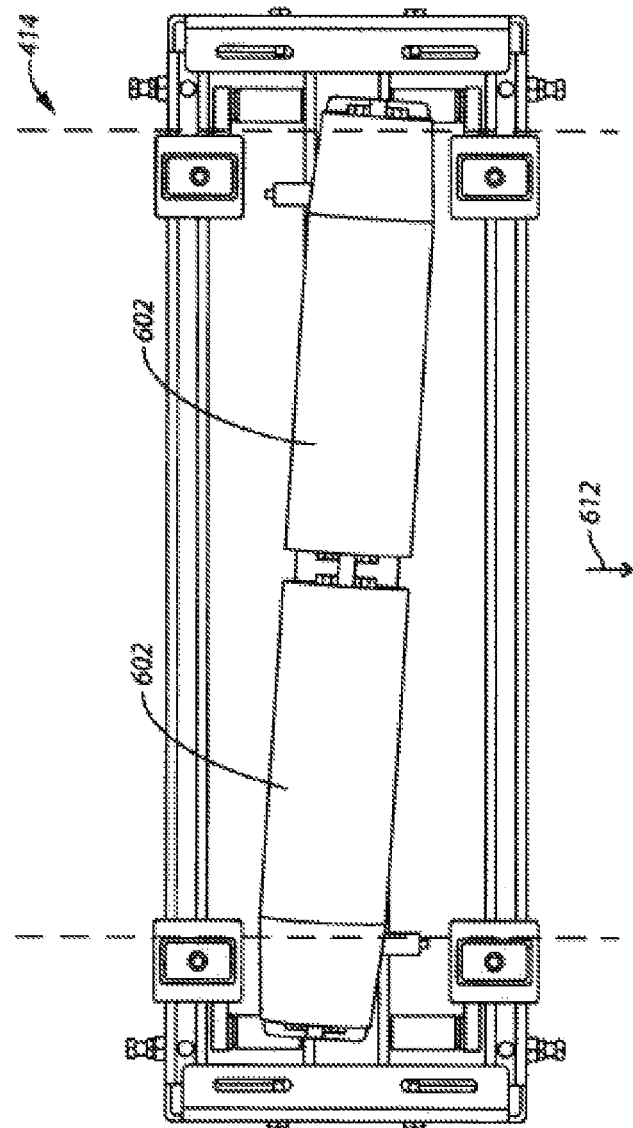
FIG. 34 is a plan view of the belt tracking apparatus of FIG. 31 showing a conveyor belt traveling in an opposite direction to that depicted in FIG. 25 with the belt mistracking toward the right idler roller and the idler rollers shifted so that the right idler roller is further downstream than the left idler roller.
Figure 35:
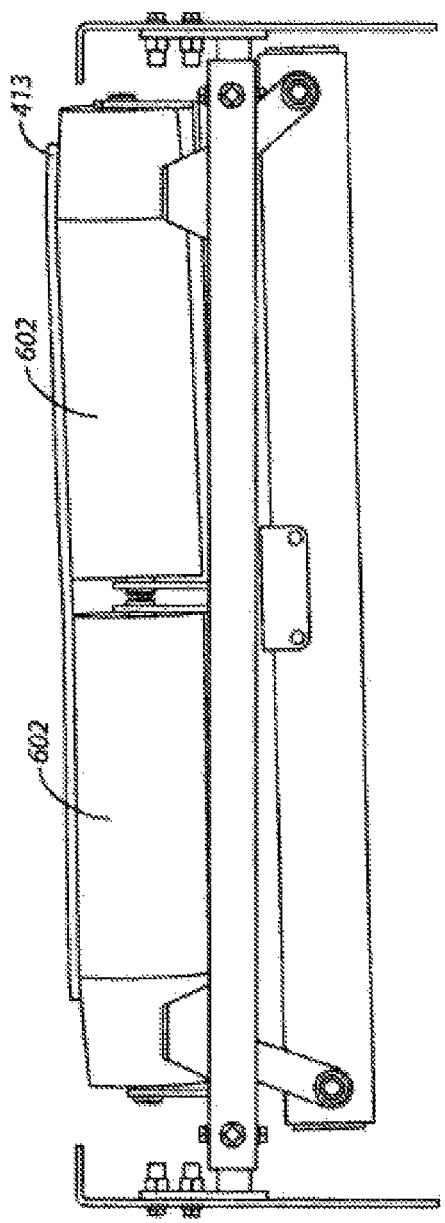
FIG. 35 is a front elevational view of the belt tracking apparatus of FIG. 31 showing the tilt frame tilted when the belt has mistracked as in FIG. 34 so that the right downstream idler roller is raised relative to the left upstream idler roller.

The conveyor belt tracking apparatus 600 has idler rollers 602 that are arranged to extend in a linear configuration as viewed in elevation in FIG. 31 so as to present an upper substantially linear line of contact for the conveyor belt flat return run 413 except at the roller tapered end portions. Thus, a pair of idler rollers 602 having identical configurations each with a tapered end portion 604 similar to the rollers 18 of the previously described belt tracking apparatus 10 are provided. To arrange the rollers 602 in their linear configuration, idler roller frame 606 is provided, as shown in FIG. 33. The idler roller frame 606 includes an elongate base member 608 with two sets of bracket members 610 that are each of equal height, as shown. Thus, as mentioned the belt tracker apparatus 600 will operate substantially the same as the belt tracker apparatus 400 so that when the return run 413 of the belt 414 is centered on the idler rollers 602 as shown in FIG. 32, the idler rollers 602 will extend substantially orthogonal to the downstream travel direction 612 of the belt 414. However, when the belt 414 mistracks toward the right idler roller 602 as shown in FIG. 34, the idler roller frame 606 will be pivoted so that the rollers 602 are skewed with the right idler roller 602 shifted further downstream than the left idler roller 602. This shifting of the idler roller frame 606 will cause the rollers 602 to provide the belt 414 with a steering action back to the left toward its correct travel path centered on the rollers 602. The resistant provided to this steering action by the lower run 413 of the belt 414 will generate a pivoting action as has been described for apparatus 400 where the right idler roller 602 will be raised relative to the left idler roller 602 which is lowered, as shown in FIG. 35.

Figure 36:
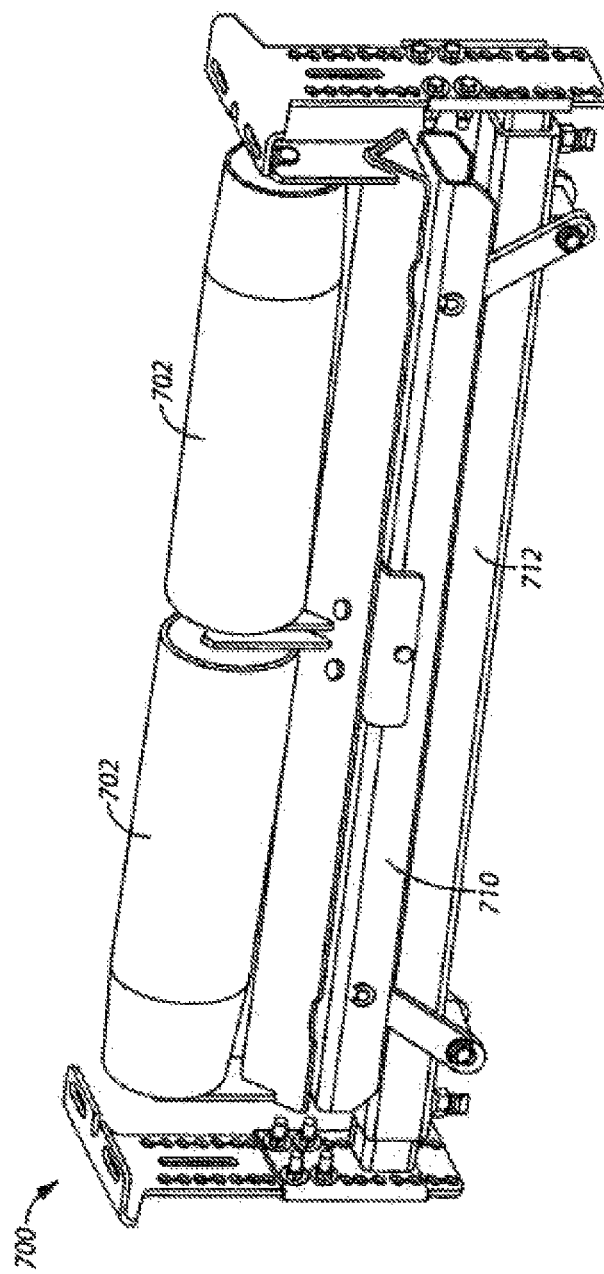
FIG. 36 is a perspective view of an alternative, return run belt tracker apparatus showing the tilt device pivotally supported by linkage members at an elevated position relative to the support base frame similar to the belt tracking apparatus of FIG. 1.
Figure 37:
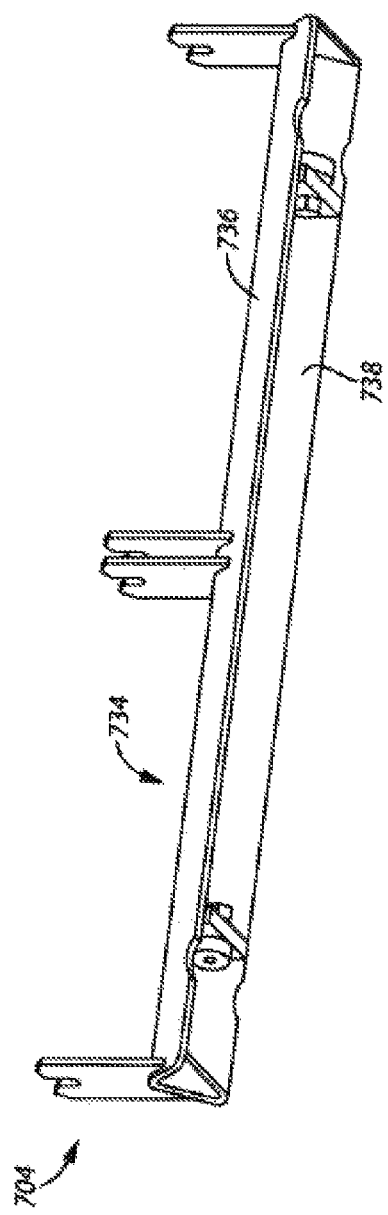
FIG. 37 is a perspective view of the idler roller device with the idler rollers removed showing an idler roller frame of the frame assembly of FIG. 36 configured to support the idler rollers in a linear configuration.

Another alternative belt tracking apparatus 700 is shown in FIG. 36. The belt tracking apparatus 700 is substantially the same in terms of its operating principles as the previously described belt tracking apparatuses 10, 400, and 600 herein. However, its structural features are a combination of those used in each of the previously described apparatuses 10, 400 and 600.

In the first instance, it should be noted that the tracker apparatus 700 has idler rollers 702 configured in identical manner to the rollers 18 of apparatus 10 and the rollers 602 of apparatus 600 to be arranged in a linear configuration as viewed in elevation for presenting a substantially straight line contact (except at their tapered end portions) to the underside of the flat return run 413 of the belt 414. Accordingly, the idler roller frame 704 is identical to the idler roller frame 606 of apparatus 600 and need not be described further herein. However, the belt tracker apparatus 700 utilizes a different arrangement of its tilt device 706 relative to its support base frame 708 when compared to the corresponding structures in the belt tracker apparatuses 400 and 600. Instead of hanging the tilt device 706 from the support base frame 708 via a linkage system, the tilt device 706 is supported in an elevated orientation relative to the support base frame 708 via its linkage system in a manner similar to corresponding structure of the previously described belt tracker apparatus 10.

Figure 38:
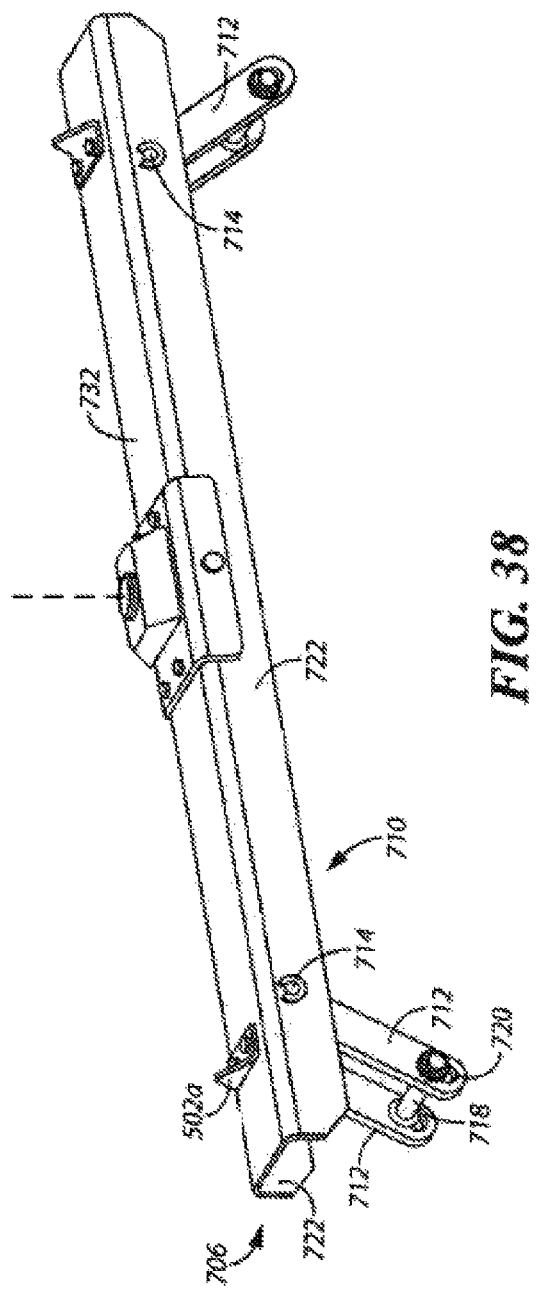
FIG. 38 is a perspective view of the tilt device showing a central pivot assembly secured thereto for pivotally securing the idler roller frame thereto similar to the central pivot assembly of FIG. 17.
Figure 39:
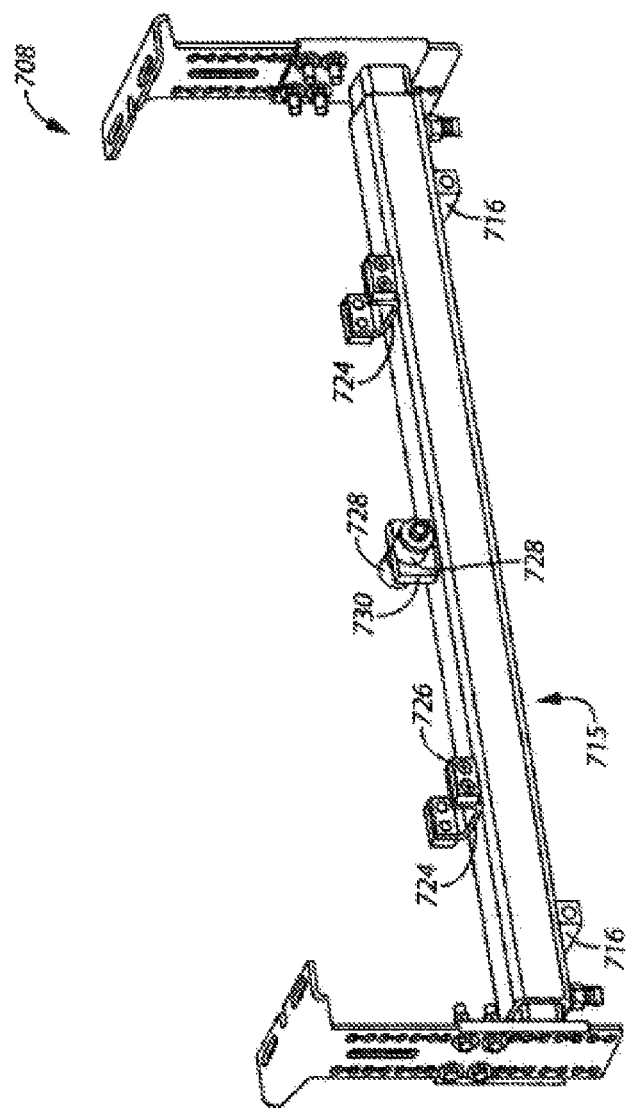
FIG. 39 is a perspective view of a support base frame showing a beam member thereof having center rollers rotatably mounted on an axle similar to that shown in FIGS. 6 and 7.

Referring to FIGS. 38 and 39, the tilt device 706 includes a main tilt frame member 710 that has pairs of linkage bars 712 pivotally mounted thereto adjacent either end thereof via upper axle members 714 extending therebetween. The support base frame 708 includes an elongate support member 715 that has mounting lugs 716 depending therefrom adjacent either end thereof. The mounting lugs 716 are operable to receive a lower axle member 718 extending therethrough and secured in the lower slots 720 of the linkage bars 712. The slots 720 in the linkage bars 712 provide for travel of the ends of the lower axle members 718 along the slots 720 for tilting of tilt frame member 710. The mounting lugs 716 are positioned laterally outward relative to the corresponding pivot connections formed by the upper axle members 714 as received in apertures of the channel member legs 722. Like the linkage bars 70, the linkage bars 712 extend obliquely, downward and lateral outward from the tilt frame member 710 to the support member 715. In this regard, like the apparatus 10, in the neutral configuration the apparatus 700 has its tilt frame member 710 elevated with respect to the support base from 708 so that the linkage bars 712 are in compression versus the linkage bars in the belt tracking apparatuses 400 and 600 having hanging tilt frame members so that they are in tension.

Figure 40:
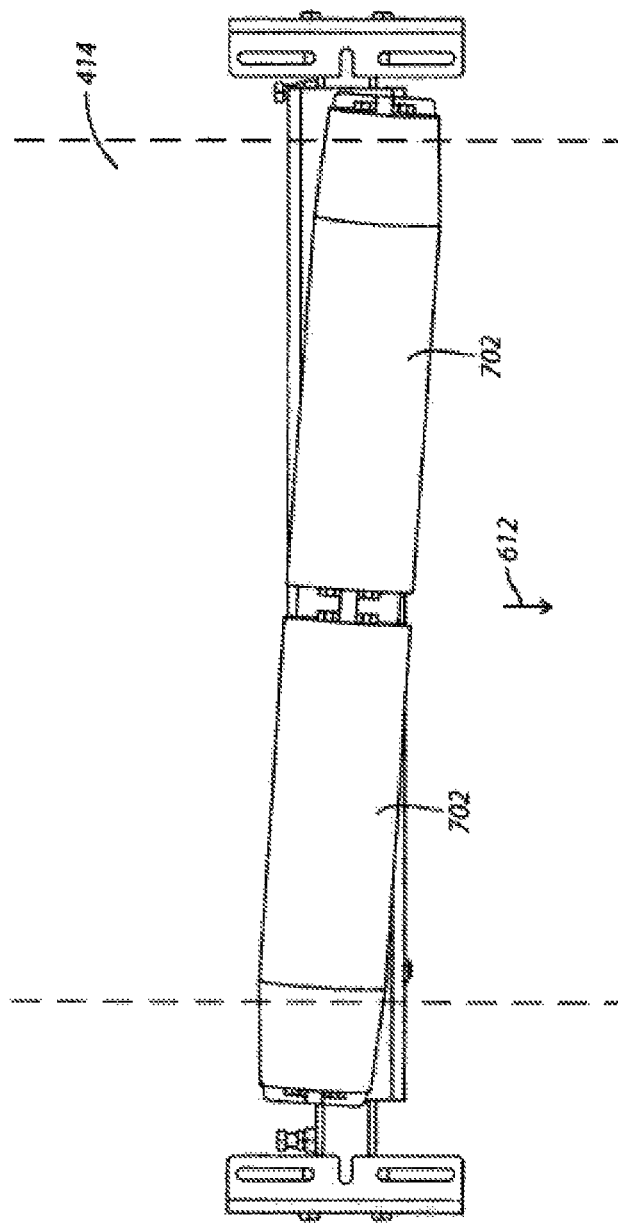
FIG. 40 is a plan view of the belt tracking apparatus of FIG. 36 showing the conveyor belt traveling in the same direction as depicted in FIG. 34 with the belt mistracking toward the right idler roller and the right idler roller shifted further downstream relative to the left idler roller.
Figure 41:
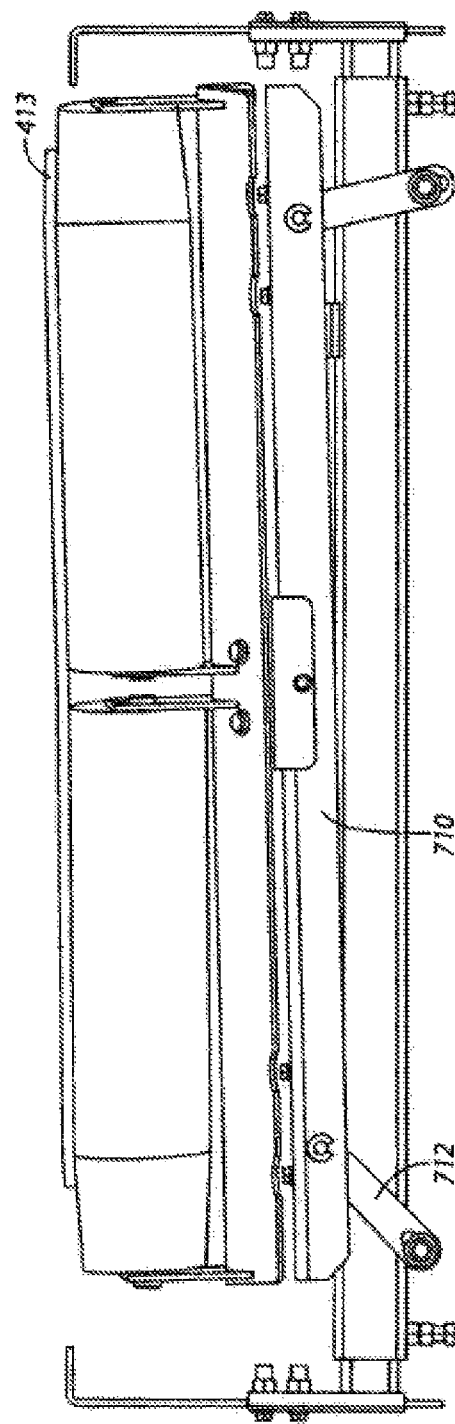
FIG. 41 is a perspective view of the belt tracking apparatus of FIG. 36 showing the tilt frame device tilted when the belt has mistracked as in FIG. 40 to raise the right idler roller relative to the left idler roller.

Thus, when the belt 414 mistracks, for example, to the right as it travels in its downstream travel direction 612, the right idler roller 702 shifts downstream and the skewed idler rollers 702 act to steer the belt 414 back to the left toward its correct travel path, as shown in FIG. 40. The reaction force from the belt 414 to this steering action causes the tilt frame member 710 to shift toward the right and become tilted with the right end thereof raised and the left end lowered from their position in the neutral configuration of the apparatus 700, as shown in FIG. 41. This generates another influence on the conveyor belt 414 that urges it back toward its correct travel path.

Similar to the belt tracker apparatus 10, referencing FIGS. 36, 38 and 39, the main frame member 710 is formed as a downwardly open channel member so that depending legs 722 thereof fit along either side of the support member 715. The support member 715 has a pair of brackets 724 fixed to the upper surface thereof with guide blocks 726 secured thereto for engaging the interior surfaces of the channel member legs 722. In this manner, the tilt device 706 is kept in alignment with support member 712 and will not become skewed relative thereto.

Also like belt tracker apparatus 10, support rollers 728 are mounted for rotation relative to a mounting block 730 secured centrally along the upper surface of the elongate support member 715. The rollers 728 engage the interior lower surface of the upper wall 732 of the frame channel member 710 for rolling therealong during lateral shifting and tilting of the member 710. However, unlike the apparatus 10, the axle for the rollers 728 does not extend in laterally extending slots in the channel member legs 722. No such slot is provided for limiting the lateral movement of the tilt frame member 710 of the apparatus 700. Instead, the guide blocks 726 are used to limit the lateral shifting of the tilt frame member 710. Accordingly, when the tilt frame member 710 is shifted laterally such as shown in FIG. 41, the left pair linkage bars 712 can engage with the corresponding left pair of guide blocks 726 so that any further lateral shifting and tilting of the tilt frame member 710 is restricted.

Referring to FIG. 38, alternative stops 502a are illustrated. The stops 502a have a triangular configuration similar to the inverted V configuration of the elongate base member 734 of the idler roller frame 704. The inclined surfaces of the triangular stops 502a are spaced sufficiently from the inclined walls 736 and 738 of the base member 734 to allow the predetermined amount of angular rotation as previously described with respect to stops 502. Further, because the stops 502a are located entirely under the base member 734, they will not present a surface on which debris from the conveyor belt 414 can accumulate.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A tracking apparatus for urging a mistracking conveyor belt back toward a correct travel path, the tracking apparatus comprising:
    at least one idler roller having opposite end portions and being operable to rotate about its longitudinal axis for supporting the conveyor belt and having a neutral position when the conveyor belt is traveling along the correct travel path; and
    a frame assembly configured to operatively mount the idler roller to conveyor structure to allow the idler roller to shift by pivoting, translating, and tilting in response to the mistracking conveyor belt for directing the belt back toward the correct travel path;
    wherein the idler roller is allowed to pivot about a central pivot axis orthogonal to the longitudinal axis of the idler roller so that one of the end portions of the idler roller is further downstream from the neutral position thereof and further downstream than the other end portion of the idler roller in response to a force applied to the idler roller by the mistracking conveyor belt;

wherein in response to the force applied to the pivoted idler roller by the mistracking belt, the pivoted idler roller is allowed to translate toward a lateral side of the mistracking belt that is in contact with the downstream end portion of the idler roller and also to tilt so that the downstream end portion of the idler roller is raised upwardly relative to a lower position thereof with the idler roller in the neutral position for urging the belt back toward the correct travel path, whereby translation of the idler roller and tilting and raising up of the idler roller one end portion only occurs as a result of the shifting of the idler roller one end portion further downstream, but does not occur with the idler roller in the neutral position.

2. The tracking apparatus of claim 1, wherein the one end portion of the idler roller tapers down toward a reduced diameter outer end.

3. The tracking apparatus of claim 1, wherein the idler roller is operatively mounted to the frame assembly via a tilt device configured to allow simultaneous translation and tilting of the idler roller.

4. The tracking apparatus of claim 1, wherein the idler roller is operatively mounted to the frame assembly via a tilt device configured such that translation of the idler roller causes the central pivot axis of the idler roller to translate in a corresponding manner.

5. The tracking apparatus of claim 1, wherein the idler roller is operatively mounted to the frame assembly such that pivoting of the idler roller so that one of the end portions of the idler roller is further downstream can occur without resulting in a corresponding tilting thereof.

6. The tracking apparatus of claim 1, wherein the frame assembly comprises at least one roller member having a rotational axis that is perpendicular to the longitudinal axis of the idler roller in the neutral position, the at least one roller member in operable engagement with the idler roller to allow translation and tilting thereof.

7. The tracking apparatus of claim 1, wherein the idler roller is operatively mounted to the frame assembly such that the idler roller is operable to direct the belt back toward the correct travel path irrespective of whether the conveyor belt is traveling in a first belt travel direction or an opposite belt travel direction.

8. The tracking apparatus of claim 1, wherein the idler roller is operatively mounted to the frame assembly such that the orientation of the central pivot axis does not shift irrespective of whether the conveyor belt is traveling in a first or an opposite belt travel direction when the idler roller is in the neutral position with the conveyor belt is traveling along the correct travel path.

9. The tracking apparatus of claim 1, wherein the idler roller is configured to be mounted below a return run of the conveyor belt such that the idler roller engages with an outside, material-engaging surface of the belt.

10. A method for urging a mistracking conveyor belt back toward a correct travel path, the method comprising;
mounting an idler roller having a tapered outer end portion under an outer side portion of the conveyor belt;
shifting the idler roller so that the tapered outer end portion is further downstream than another end of the idler roller in response to the conveyor belt mistracking toward the tapered outer end portion due to greater engagement of the corresponding belt outer side portion with the tapered outer end portion;
steering the conveyor belt back toward the correct travel path with the shifted idler roller;
causing the idler roller to undergo a tilting action so that the tapered outer end portion that is shifted downstream shifts upwardly relative to the other end of the idler roller in response to a reaction force received from the conveyor belt being steered by the idler roller; and
urging the conveyor belt back to generally shift in a lateral direction away from the raised end portion back toward the correct travel path due to the tilting of the idler roller.

11. The method of claim 10, further comprising causing the idler roller to translate toward the outer side portion of the conveyor belt when the tapered outer end of the idler roller is further downstream than the other end thereof in response to the reaction force received from the conveyor belt being steered by the idler roller.

12. The method of claim 11, wherein the translation and tilting of the idler roller may occur simultaneously in response to the reaction force received from the conveyor belt being steered by the idler roller.

13. The method of claim 10, further wherein mounting the idler roller comprises mounting the idler roller to a frame assembly via a tilt device, and tilting the idler roller comprises shifting the tilt device in response to receipt of the reaction force from the steered conveyor belt, and tilting the idler roller as the tilt device is shifted.

* * * * *